(12) United States Patent
Jeon et al.

(10) Patent No.: US 11,514,615 B2
(45) Date of Patent: Nov. 29, 2022

(54) STREAMING SYSTEMS AND METHODS OF PROVIDING INTERACTIVE STREAMING SERVICE

(71) Applicant: Samsung Electronics Co., Ltd., Suwon-si (KR)

(72) Inventors: Hyoungjun Jeon, Seongnam-si (KR); Sanghyuck Ha, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/036,437

(22) Filed: Sep. 29, 2020

(65) Prior Publication Data

US 2021/0329340 A1 Oct. 21, 2021

(30) Foreign Application Priority Data

Apr. 16, 2020 (KR) .................. 10-2020-0045787

(51) Int. Cl.
*G06T 9/00* (2006.01)
*H04N 21/44* (2011.01)
*H04N 21/466* (2011.01)

(52) U.S. Cl.
CPC ............ *G06T 9/002* (2013.01); *H04N 21/44* (2013.01); *H04N 21/4662* (2013.01)

(58) Field of Classification Search
CPC ............................ G06T 9/002; H04N 21/4662
USPC ........................................................ 375/240
See application file for complete search history.

(56) References Cited

U.S. PATENT DOCUMENTS

| 6,137,912 | A | 10/2000 | Kostrzewski et al. |
| 8,351,508 | B1 | 1/2013 | Foulds et al. |
| 9,986,255 | B2 | 5/2018 | Wang et al. |
| 10,284,432 | B1 | 5/2019 | Kuo et al. |
| 10,623,775 | B1* | 4/2020 | Theis ................... H04N 19/124 |
| 2018/0109751 | A1* | 4/2018 | Choi ..................... G06V 20/20 |
| 2018/0139458 | A1* | 5/2018 | Wang .................... H04N 19/17 |
| 2019/0246102 | A1 | 8/2019 | Cho et al. |
| 2019/0306526 | A1 | 10/2019 | Cho et al. |
| 2020/0084255 | A1* | 3/2020 | McLoughlin ........ G06N 3/0454 |
| 2020/0289937 | A1* | 9/2020 | Osman .................. A63F 13/355 |
| 2021/0001216 | A1* | 1/2021 | Sanders ................ G06N 20/00 |

FOREIGN PATENT DOCUMENTS

JP 2018/0201117 A 12/2018

\* cited by examiner

*Primary Examiner* — Jeffery A Williams
(74) *Attorney, Agent, or Firm* — Harness, Dickey & Pierce, P.L.C.

(57) ABSTRACT

A streaming system includes a streaming server and a client device. The streaming server is configured to train an interactive frame prediction model based on streaming data, a user input and metadata associated with the user input, encode the streaming data by selectively using a predicted frame generated based on the trained interactive frame prediction model and transmit the trained interactive frame prediction model and the encoded streaming data. The client device is configured to receive the trained interactive frame prediction model and the encoded streaming data, and decode the encoded streaming data based on the trained interactive frame prediction model to provide recovered streaming data to a user.

20 Claims, 22 Drawing Sheets

FIG. 18A
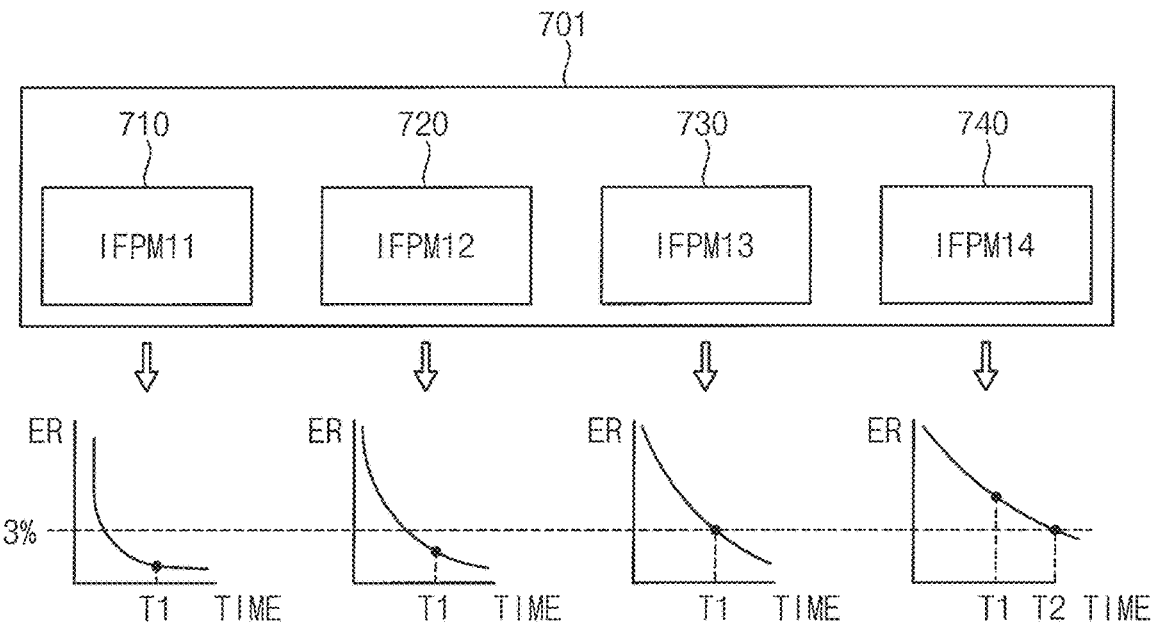
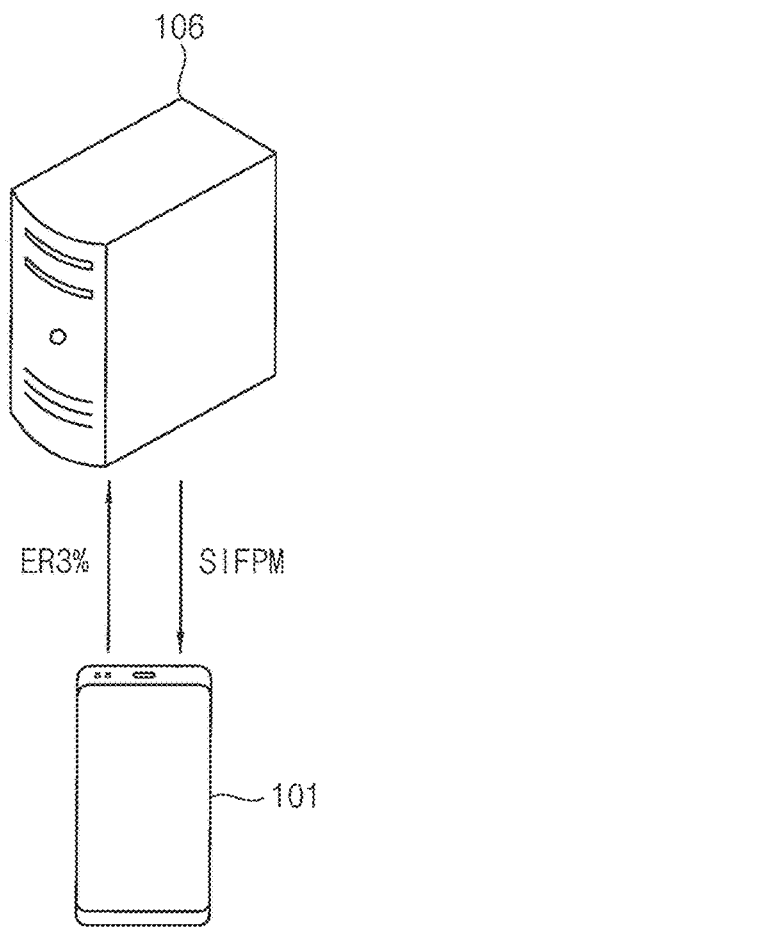

STREAMING SYSTEMS AND METHODS OF PROVIDING INTERACTIVE STREAMING SERVICE

CROSS-REFERENCE TO RELATED APPLICATION

This application claims priority under 35 USC § 119 to Korean Patent Application No. 10-2020-0045787, filed on Apr. 16, 2020, in the Korean Intellectual Property Office (KIPO), the disclosure of which is incorporated in its entirety by reference herein.

BACKGROUND

1. Technical Field

Example embodiments relate generally to providing streaming data, and more particularly to streaming systems providing streaming services with an interactive scheme and methods of providing an interactive streaming service.

2. Discussion of the Related Art

An interactive streaming service such as game streaming is one of next-generation fields that recently emerge. Recently, high-specification games are introduced and game streaming service becomes important because a client device cannot run the high-specification games. In game streaming service, it is important to provide high-resolution frames to users rapidly.

SUMMARY

Some example embodiments provide a streaming system capable of adaptively using an interactive frame prediction model based on user input.

Some example embodiments provide a method of providing an interactive streaming service, capable of adaptively using an interactive frame prediction model based on user input.

According to some example embodiments, a streaming system includes a streaming server and a client device. The streaming server is configured to train an interactive frame prediction model based on streaming data, a user input and metadata associated with the user input, encode the streaming data by selectively using a predicted frame generated based on the trained interactive frame prediction model and transmit the trained interactive frame prediction model and the encoded streaming data. The client device is configured to receive the trained interactive frame prediction model and the encoded streaming data, and decode the encoded streaming data based on the trained interactive frame prediction model to provide recovered streaming data to a user.

According to some example embodiments, a streaming system includes a streaming server and a client device. The streaming server is configured to select a target interactive frame prediction model among a plurality of interactive frame prediction models, train the target interactive frame prediction model based on streaming data, a user input and metadata associated with the user input and by using the target interactive frame prediction model, generate a predicted frame by using the target interactive frame prediction model, encodes the streaming data by selectively using the predicted frame and transmits the encoded streaming data. The client device is configured to receive the plurality of interactive frame prediction models and the encoded streaming data, select the target interactive frame prediction model among the plurality of interactive frame prediction models and decode the encoded streaming data based on the target interactive frame prediction model to provide recovered streaming data to a user According to some example embodiments, in a method of providing an interactive streaming service, an interactive frame prediction model which is trained by a streaming server based on streaming data, a user input and metadata associated with the user input and encoded streaming data is provided to a client device by the streaming server, the encoded streaming data is decoded by the client device based on the trained interactive frame prediction model received from the streaming server to generate recovered streaming data, and the recovered streaming data is displayed to a user through the display by the client device.

Accordingly, the streaming system and associated method may increase or improve compression rate by generating a predicted frame based on using an interactive frame prediction model and by encoding streaming data based on the predicted frame. Therefore, the streaming system and associated method may transmit high-resolution frames to user in or close to real time.

BRIEF DESCRIPTION OF THE DRAWINGS

Illustrative, non-limiting example embodiments will be more clearly understood from the following detailed description in conjunction with the accompanying drawings.

FIGS. 18A and 18B illustrate example operations of the client device, respectively.

DETAILED DESCRIPTION

Example embodiments will be described more fully hereinafter with reference to the accompanying drawings.

Figure 1:
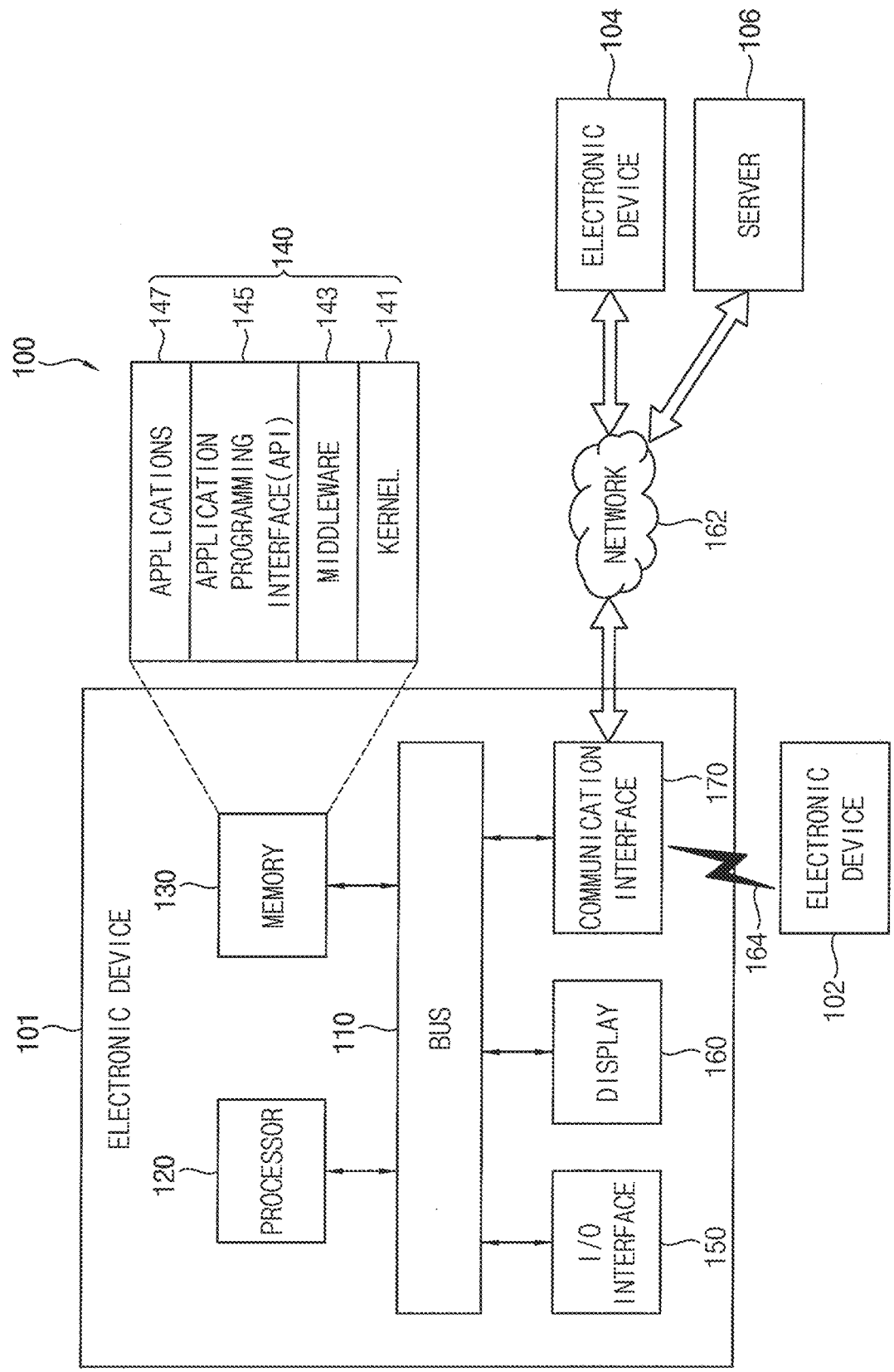
FIG. 1 illustrates an electronic device in a network environment according to example embodiments.

FIG. 1 illustrates an electronic device in a network environment according to example embodiments.

Referring to FIG. 1, an electronic device 101 in an network environment 100 may include a bus 110, a processor 120, a memory 130, an input/output (I/O) interface 150, a display 160, and a communication interface 170. According to some example embodiments, the electronic device 101 may omit at least one of the foregoing elements or may further include other elements. The bus 110 may include a circuit for connecting, e.g., the elements 110 to 170 and delivering communication (e.g., a control message or data) between the elements 110 to 170. The processor 120 may include one or more of a central processing unit (CPU), an application processor (AP), and a communication processor (CP). The processor 120 performs operations or data processing for control and/or communication of, for example, at least one other elements of the electronic device 101.

The processor 120 and/or any portions thereof (e.g., processing units), as well as other computer devices (e.g., servers, and streaming cards) in the alternative, may be implemented by one or more instances of processing circuitry such as hardware including logic circuits; a hardware/software combination such as a processor executing software as described in the above embodiment; or a combination thereof.

The memory 130 may include a volatile and/or nonvolatile memory. The memory 130 may store, for example, instructions or data associated with at least one other elements of the electronic device 101. According to some example embodiments, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS). The kernel 141 may control or manage, for example, system resources (e.g., the bus 110, the processor 120, the memory 130, etc.) used to execute operations or functions implemented in other programs (e.g., the middleware 143, the API 145, or the application program 147).

The kernel 141 provides an interface through which the middleware 143, the API 145, and/or the application program 147 accesses separate components of the electronic device 101 to control or manage the system resources.

The middleware 143 may work as an intermediary for allowing, for example, the API 145 or the application program 147 to exchange data in communication with the kernel 141. In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147, and may process the one or more task requests.

The API 145 is an interface used for the application 147 to control a function provided by the kernel 141 or the middleware 143, and may include, for example, at least one interface or function (e.g., an instruction) for file control, window control, image processing or character control. The I/O interface 150 may deliver, for example, an instruction or data input from a user or another external device to other component(s) of the electronic device 101, or output an instruction or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, and/or a symbol, etc.) to users. The display 160 may include a touch screen, and receives a touch, a gesture, proximity, or a hovering input, for example, by using an electronic pen or a part of a body of a user.

The communication interface 170 establishes communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106).

Wireless communication may include a cellular communication protocol using at least one of, for example, long-term evolution (LTE), LTE advance (LTE-A), code division multiple access (CDMA), wideband CDMA (WCDMA), universal mobile telecommunications system (UMTS), wireless broadband (WiBro), global system for mobile communications (GSM), and so forth. According to some example embodiments, the wireless communication may include at least one of Wireless Fidelity (WiFi), Bluetooth, Bluetooth Low Energy (BLE), Zigbee, near field communication (NFC), magnetic secure transmission (MST), radio frequency (RF), and a body area network (BAN). According to some example embodiments, the wireless communication may include a global navigation satellite system (GNSS). The GNSS may include, for example, at least one of a global positioning system (GPS), a global navigation satellite system (Glonass), a Beidou navigation satellite system ("Beidou"), and Galileo, the European global satellite-based navigation system. Hereinbelow, "GPS" may be used interchangeably with "GNSS". The wired communication may include, for example, at least one of a universal serial bus (USB), a high definition multimedia interface (HDMI), a recommended standard 232 (RS-232), power line communication, a plain old telephone service (POTS), and so forth. The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101.

According to some example embodiments, some or all of operations performed by the electronic device 101 may be performed in another electronic device or a plurality of electronic devices (e.g., the electronic device 102 or 104, or the server 106). According to some example embodiments of the inventive concepts, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The another electronic device (e.g., the electronic device 102 or 104 or the server 106) may execute the requested function or additional function and deliver the execution result to the electronic device 101. The electronic device 101 may then process or further process the received result to provide the requested function or service. To that end, a cloud computing, distributed computing, or client-server computing technology may be used, for example.

In FIG. 1, each of the electronic devices 101, 102 and 104 may be referred to as a client device and the server 106 may be referred to as a streaming server.

Figure 2:
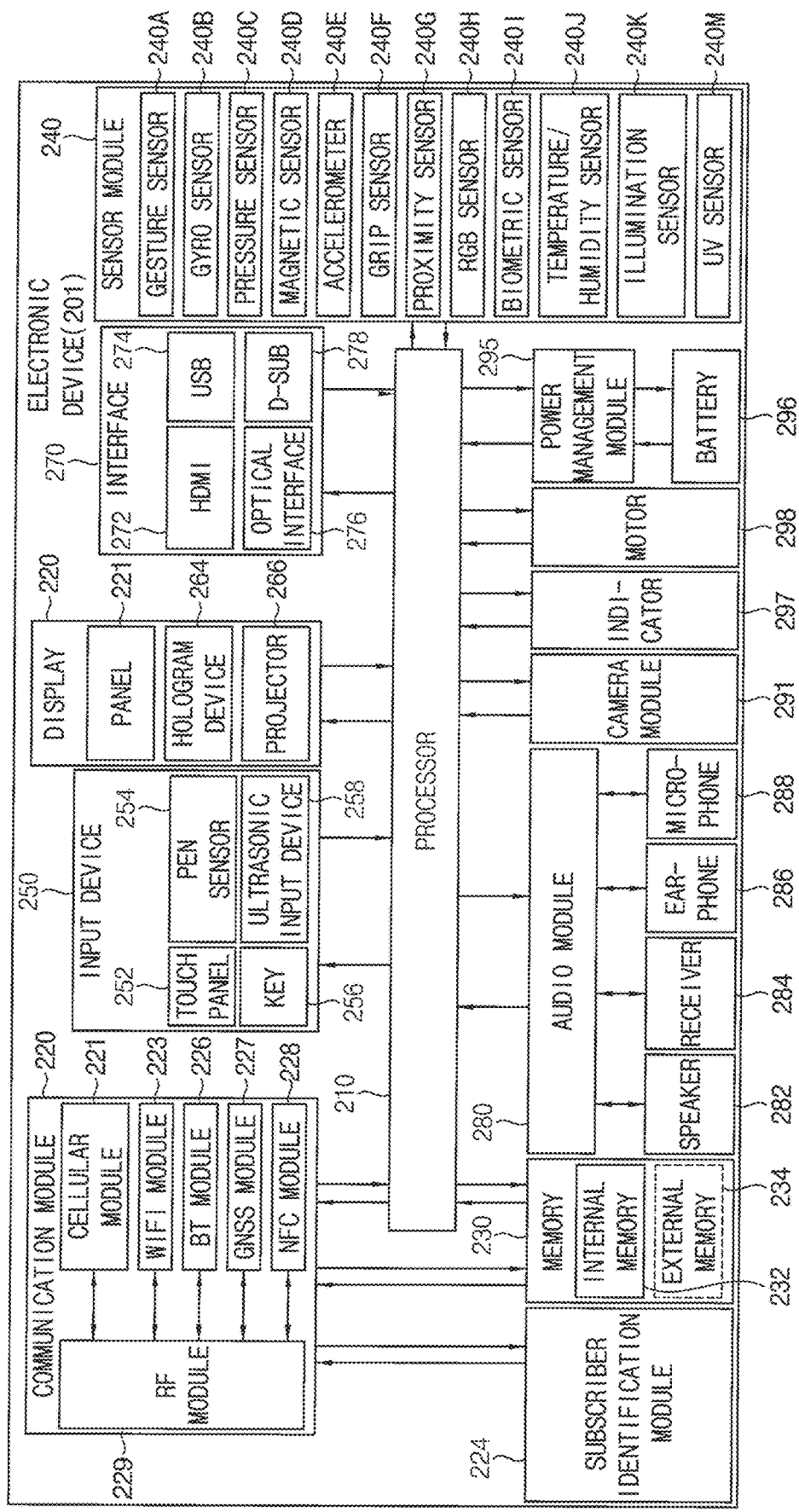
FIG. 2 is a block diagram illustrating an electronic device according to example embodiments.

FIG. 2 is a block diagram illustrating an electronic device according to example embodiments.

Referring to FIG. 2, an electronic device 201 may form the entire electronic device 101 illustrated in FIG. 1 or a part of the electronic device 101 illustrated in FIG. 1.

The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 controls multiple hardware or software components connected to the processor 210 by driving an operating system (OS) or an application program, and performs processing and operations with respect to various data. The processor 210 may be implemented with, for example, a system on chip (SoC). According to some example embodiments of the inventive concepts, the server 210 may include a graphic processing unit (GPU) and/or an image signal processor. The processor 210 may include at least some of the elements illustrated in FIG. 2 (e.g., the cellular module 221). The processor 210 loads an instruction or data received from at least one of other elements (e.g., a non-volatile memory) into a volatile memory to process the instruction or data, and stores result data in the non-volatile memory.

The communication module 220 may have a configuration that is the same as or similar to the communication interface 170. The communication module 220 may include, for example, the cellular module 221, a WiFi module 223, a Bluetooth (BT) module 225, a GNSS module 227, an NFC module 228, and a radio frequency (RF) module 229.

The cellular module 221 may provide, for example, a voice call, a video call, a text service, or an Internet service over a communication network. According to some example embodiments, the cellular module 221 identifies and authenticates the electronic device 201 in a communication network by using the SIM 224 (e.g., a SIM card). According to some example embodiments, the cellular module 221 may perform at least one of functions that may be provided by the processor 210.

According to some example embodiments, the cellular module 221 may include a communication processor (CP). According to some example embodiments, at least some (e.g., two or more) of the cellular module 221, the WiFi module 223, the BT module 225, the GNSS module 227, and the NFC module 228 may be included in one integrated chip (IC) or IC package.

The RF module 229 may, for example, transmit and receive a communication signal (e.g., an RF signal). The RF module 229 may include a transceiver, a power amplifier module (PAM), a frequency filter, a low noise amplifier (LNA), or an antenna. According to some example embodiments, at least one of the cellular module 221, the WiFi module 223, the BT module 225, the GNSS module 227, and the NFC module 228 may transmit and receive an RF signal through the separate RF module.

The SIM 224 may, for example, include a card including a SIM or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234.

The internal memory 232 may, for example, include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, and a solid state drive (SSD).

The external memory 23b may further include flash drive, for example, compact flash (CF), secure digital (SD), micro-SD, mini-SD, extreme Digital (xD), a multi-media card (MMC), or a memory stick. The external memory 234 may be functionally or physically connected with the electronic device 201 through various interfaces.

The sensor module 240 measures physical quantity or senses an operation state of the electronic device 201 to convert the measured or sensed information into an electric signal.

The sensor module 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., red/green/blue (RGB) sensor), a biometric sensor 240I, a temperature/humidity sensor 240J, an illumination sensor 240K, and a ultraviolet (UV) sensor 240M.

Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In some example embodiments, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258, although example embodiments are not limited thereto. The input device 250 may be configured to receive commands from outside of the electronic device 201. The touch panel 252 may use at least one of a capacitive type, a resistive type, an IR type, or an ultrasonic type. The touch panel 252 may further include a control circuit.

The touch panel 252 may further include a tactile layer to provide tactile reaction to the user. The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, a projector 266, and/or a control circuit for controlling them. The panel 262 may be implemented to be flexible, transparent, or wearable. The panel 262 may be configured with the touch panel 252 in one module.

According to some example embodiments, the panel 262 may include a pressure sensor (or a "force sensor", interchangeably used hereinafter) capable of measuring a strength of a pressure by a user's touch. The pressure sensor may be implemented integrally with the touch panel 252 or may be implemented as one or more sensors separate from the touch panel 252. The hologram device 264 may show a stereoscopic image in the air by using interference of light. The projector 266 may display an image onto a screen through projection of light. The screen may be positioned inside or outside the electronic device 201.

The interface 270 may include an HDMI 272, a USB 274, an optical interface 276, or a D-subminiature (D-sub) 278. The interface 270 may be included in the communication interface 170 illustrated in FIG. 1. Additionally or alternatively, the interface 270 may include a mobile high-definition link (MHL) interface, an SD/multi-media card (MMC) interface, or an Infrared Data Association (IrDA) interface.

The audio module 280 may bi-directionally convert sound and an electric signal. At least one element of the audio module 280 may be included in the input/output interface 150 illustrated in FIG. 1. The audio module 280 may process sound information input or output through the speaker 282, the receiver 284, the earphone 286, or the microphone 288.

The camera module 291 is, for example, a device capable of capturing a still image or a moving image, and according to some example embodiments, may include one or more image sensors (e.g., a front sensor or a rear sensor), a lens, an image signal processor (ISP), or a flash (e.g., an LED, a xenon lamp, etc.).

The power management module 295 manages power of the electronic device 201. According to some example embodiments, the power management module 295 may include a power management integrated circuit (PMIC), a charger IC, or a battery fuel gauge.

The PMIC may have a wired and/or wireless charging scheme. The wireless charging scheme may include a magnetic-resonance type, a magnetic induction type, and an electromagnetic type, and may further include an additional circuit for wireless charging, for example, a coil loop, a resonance circuit, or a rectifier. The battery gauge may measure the remaining capacity of the battery 296 or the voltage, current, or temperature of the battery 296 during charging. The battery 296 may include, for example, a rechargeable battery and/or a solar battery.

The indicator 297 displays a particular state, for example, a booting state, a message state, or a charging state, of the electronic device 201 or a part thereof (e.g., the processor 210). The motor 298 may convert an electric signal into mechanical vibration or generates vibration or a haptic effect. The electronic device 201 may include a device for supporting the mobile TV (e.g., a GPU) to process media data according to a standard such as digital multimedia broadcasting (DMB), digital video broadcasting (DVB), or mediaFlo™.

Figure 3:
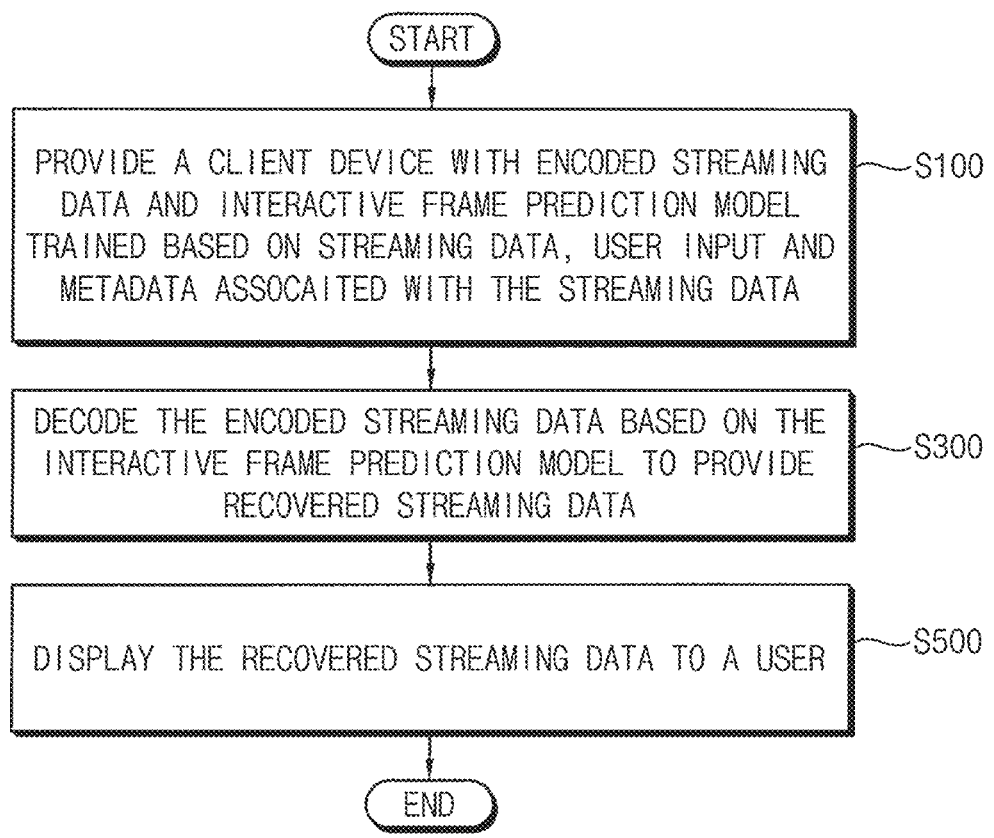
FIG. 3 is a flow chart illustrating a method of providing an interactive streaming service according to example embodiments.

FIG. 3 is a flow chart illustrating a method of providing an interactive streaming service according to example embodiments.

Hereinafter, in FIG. 1, the electronic device 101 may correspond to a client device and the server 106 may correspond to a streaming server.

Referring to FIGS. 1 and 3, the streaming server 106 connected to the client device 101 through the network 102 may transmit an encoded streaming data and an interactive frame prediction model trained based on streaming data, a user input and metadata associated with the user input to the client device 101 (operation S100). The interactive frame prediction model may be implemented with a neural network and may be stored in a memory in the streaming server 106.

A processor in the streaming server 106 may apply the user input, learning streaming data and the metadata to the interactive frame prediction model to train the interactive frame prediction model. When training of the interactive frame prediction model is completed, the interactive frame prediction model may receive the user input, the streaming data and the metadata as input and may provide a predicted frame of a subject frame of the streaming data as an output. An encoder in the streaming server 106 may encode the streaming data by selectively using the predicted frame and may provide the encoded streaming data to the client device 101.

The client device 101 may decode the encoded streaming data based on the trained interactive frame prediction model received from the streaming server 106 to generate a recovered streaming data (operation S300). The client device 101 may display (provide) the recovered streaming data to a user through a display (operation S500). The user may apply the user input to the streaming data to the I/O interface.

Figure 4:
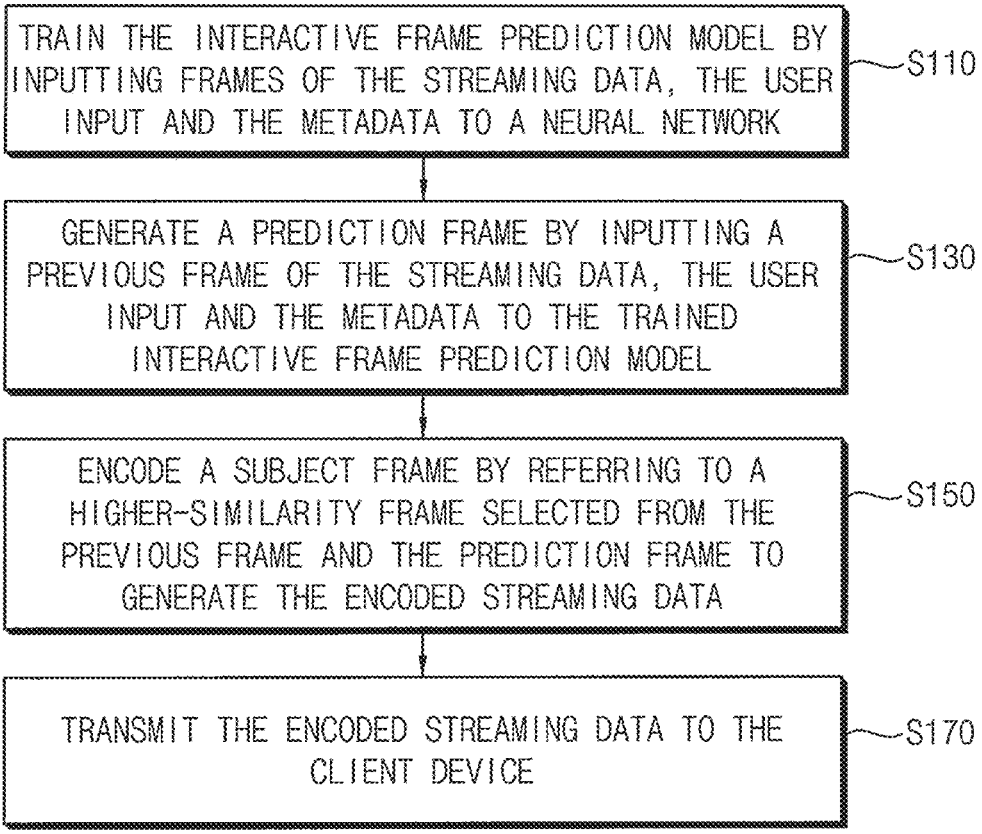
FIG. 4 is a flow chart illustrating an operation of the streaming server in FIG. 3 according to example embodiments.

FIG. 4 is a flow chart illustrating an operation of the streaming server in FIG. 3 according to example embodiments.

Referring to FIG. 4, for transmitting the encoded streaming data and the interactive frame prediction model (operation S100), the processor in the streaming server 106 may apply frames of the streaming data, the user input and the metadata to the neural network to train the interactive frame prediction model (operation s110).

When the training of the interactive frame prediction model is completed, the processor in the streaming server 106 may input a previous frame, the user input and the metadata to the interactive frame prediction model to generate the predicted frame of the subject frame of the streaming data (operation S130).

The encoder in the streaming server 106 may encode the streaming data by referring to a higher-similarity frame selected from the previous frame and the predicted frame to generate the encoded streaming data (operation S1510). The higher-similarity frame has a higher similarity with the subject frame.

The streaming server 106 may transmit the encoded streaming data to the client device 101 (operation S170).

Figure 5:
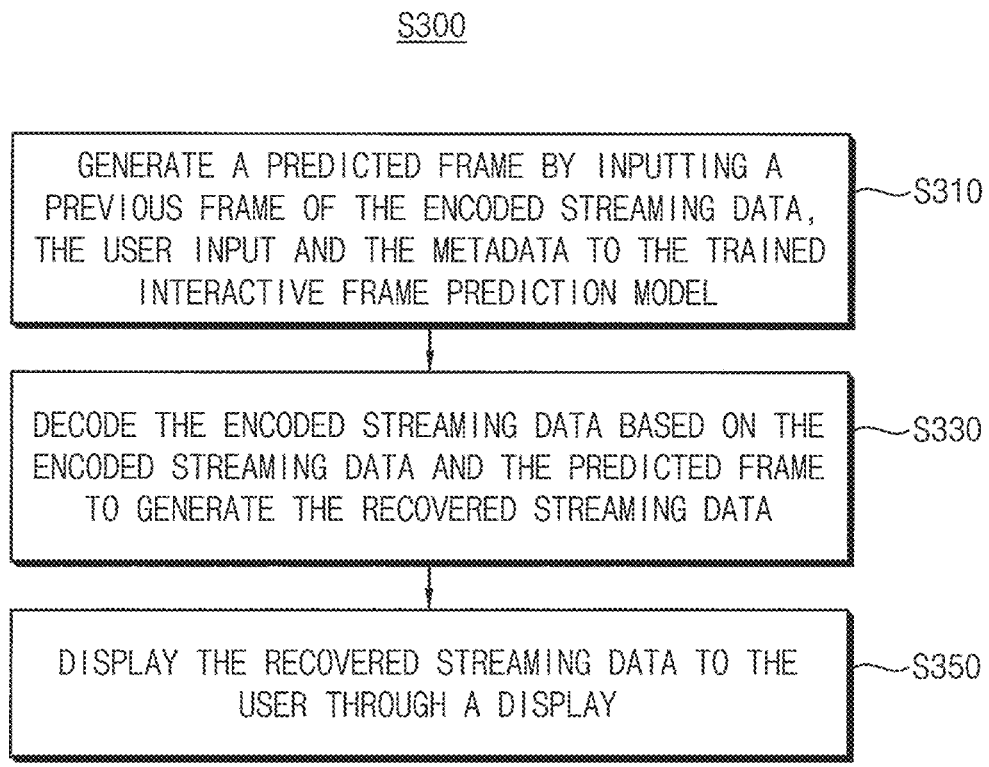
FIG. 5 is a flow chart illustrating an operation of the client device in FIG. 3 according to example embodiments.

FIG. 5 is a flow chart illustrating an operation of the client device in FIG. 3 according to example embodiments.

Referring to FIG. 5, for generating the recovered streaming data (operation S300), a processor in the client device 101 may apply the encoded streaming data, the user input, the metadata to the trained interactive frame prediction model received from the streaming server 106 to generate the predicted frame (operation S310).

A decoder in the client device 101 may decode the encoded streaming data based on the predicted frame and the encoded streaming data to generate the recovered streaming data (operation S330). The decoder in the client device 101 may encode the subject frame by referring to a higher-similarity frame selected from the previous frame of the encoded streaming data and the predicted frame.

The processor in the client device 101 may display (provide) the recovered streaming data to the user through the display in the client device 101 (operation S350).

Figure 6:
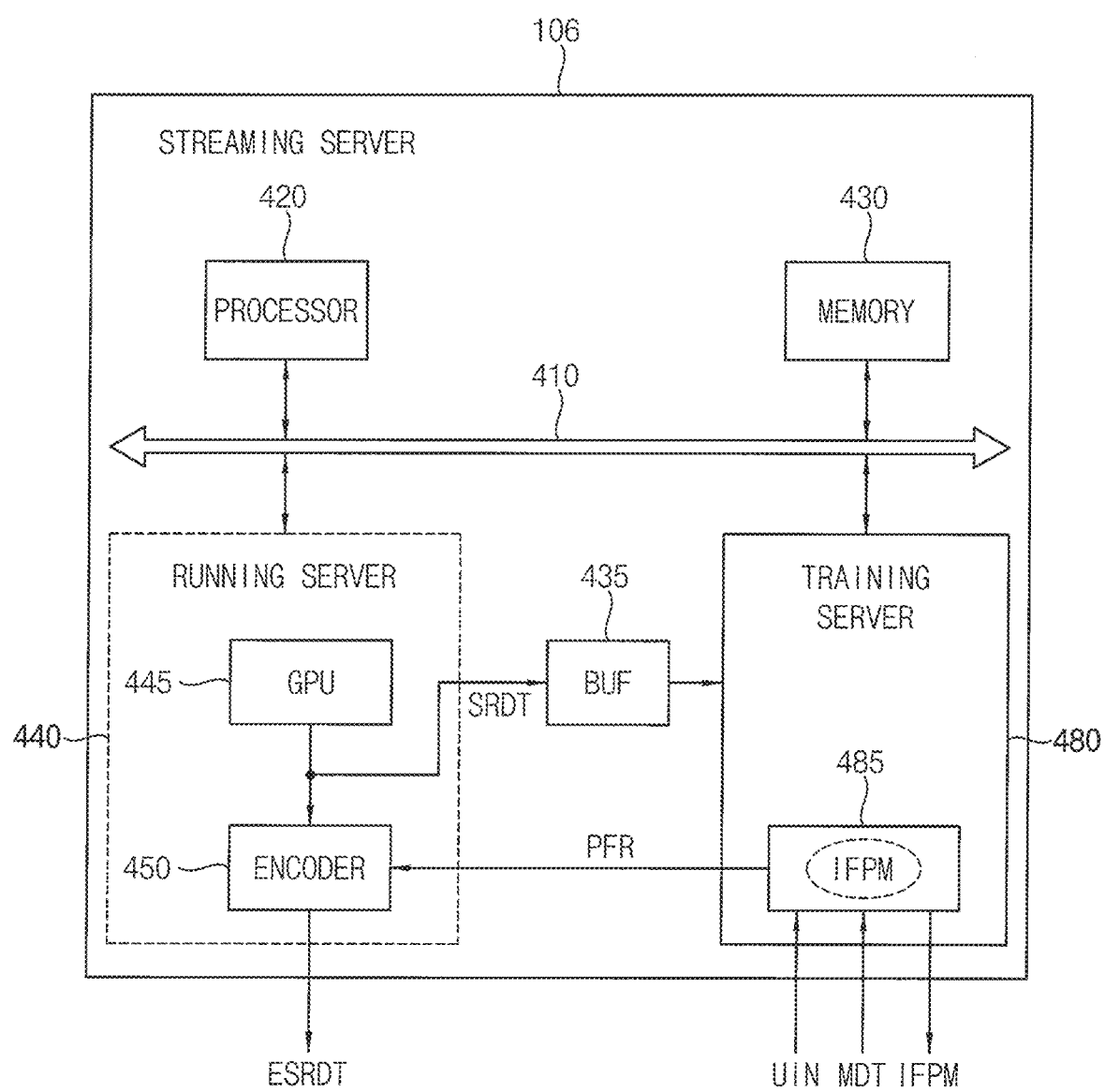
FIG. 6 is a block diagram illustrating an example of the streaming server in FIG. 1 according to example embodiments.

FIG. 6 is a block diagram illustrating an example of the streaming server in FIG. 1 according to example embodiments.

Referring to FIG. 6, the streaming server 106 may include a processor 420, a memory 430, a running server 440 and a training server 480. The processor 420, the memory 430, the running server 440 and the training server 480 may be operatively coupled to each other through a bus 410.

The running server 440 may include a GPU 445 and an encoder 450. The training server 480 may store a neural network 485 that implements an interactive frame prediction model IFPM.

The memory 430 may stores instructions. The processor 420 may execute the instructions stored in the memory 430 to control the running server 440 and the training server 480 to perform specific operations.

The GPU 445 may generate streaming data SRDT associated with games of virtual realities and may provide the streaming data SRDT to a buffer 435 and the encoder 450. The buffer 435 may store the streaming data SRDT on frame basis and may provide the frames of the streaming data SRDT to the training server 480.

The training server 480 may apply user input UIN, metadata MDT associated with the user input UIN and the streaming data SRDT to the interactive frame prediction model IFPM to train the interactive frame prediction model IFPM. For example of the game, the metadata MDT may be information which is used for understanding context of the game in a position of a user. The metadata MDT may include information of map which is played, information of character and information of weapon.

The processor 420 may determine that the training on the interactive frame prediction model IFPM is completed when a difference between a compression rate of an output of the interactive frame prediction model IFPM in response to the user input UIN, the metadata MDT and streaming data SRDT and a compression rate of an expected value is within a reference value. That is, the processor 420 may determine that the training on the interactive frame prediction model IFPM is completed in response to a difference between a compression rate of the predicted frame and a compression rate of an expected frame associated with the predicted frame being within the reference value.

The training server 480 may train the interactive frame prediction model IFPM in advance or may train the interactive frame prediction model IFPM as soon as the training server 480 receives the user input UIN and the metadata MDT.

When the training on the interactive frame prediction model IFPM is completed, the processor 420 controls the training server 480 to transmit the trained interactive frame prediction model IFPM to the client device 101.

The trained interactive frame prediction model IFPM may provide a predicted frame PFR to the encoder 450 in response to the user input UIN, the metadata MDT and streaming data SRDT as an input.

The encoder 450 may encode a subject frame of the streaming data SRDT by referring to a higher-similarity frame selected from a previous frame of the streaming data SRDT and the predicted frame PFR, which has a higher similarity with the subject frame to generate an encoded streaming data ESRDT and may transmit the encoded streaming data ESRDT to the client device 101.

When the encoder 450 performs inter-prediction or intra-prediction, the encoder 450 may encode the subject frame of the streaming data SRDT by referring to a higher-similarity frame selected from the previous frame of the streaming data SRDT and the predicted frame PFR.

The streaming server 106 may transmit the trained interactive frame prediction model IFPM and the encoded streaming data ESRDT to the client device 101 though a communication interface included therein.

Figure 7:
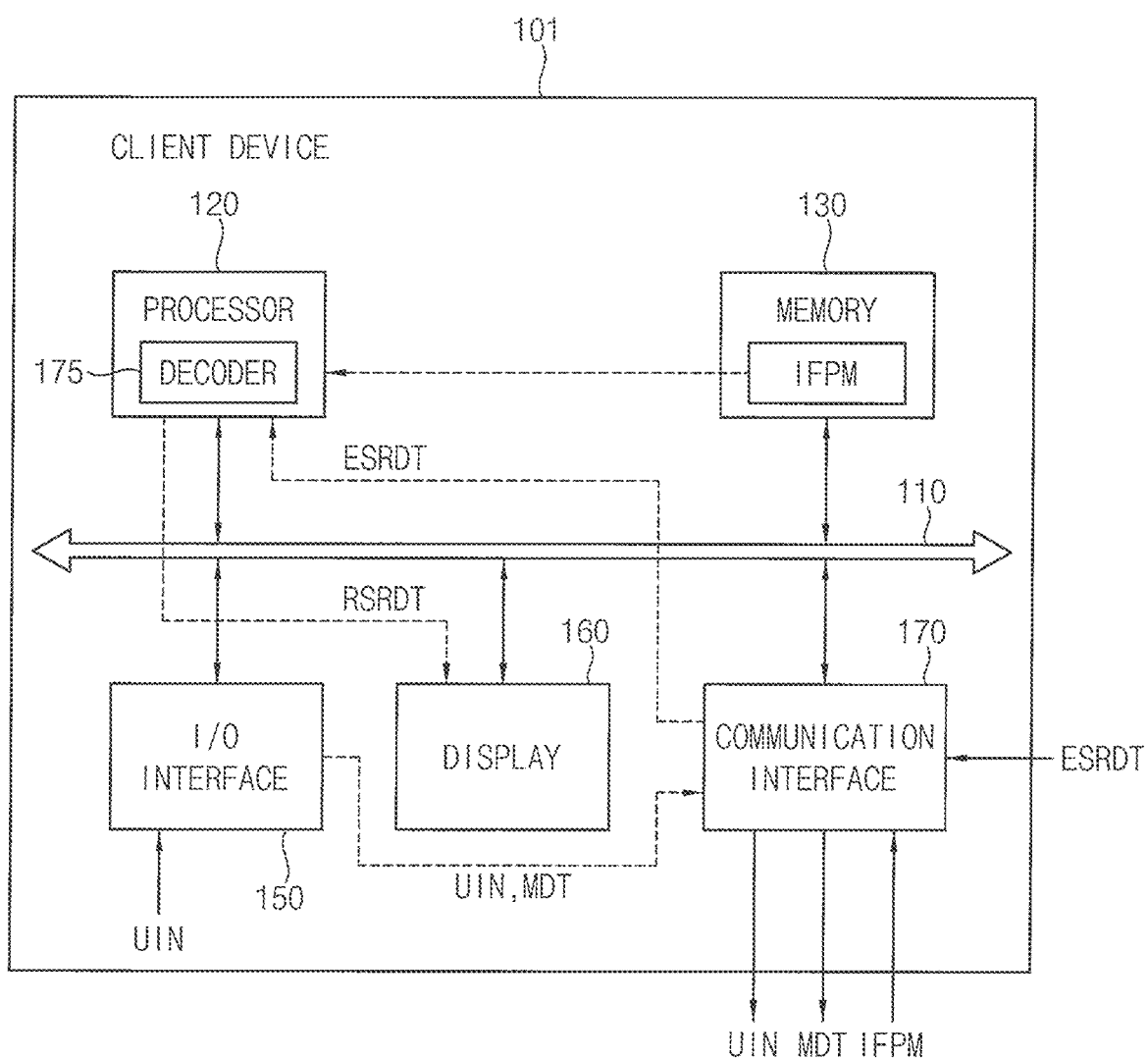
FIG. 7 is a block diagram illustrating an example of the client device in FIG. 1 according to example embodiments.

FIG. 7 is a block diagram illustrating an example of the client device in FIG. 1 according to example embodiments.

Referring to FIG. 7, the client device 101 may include a processor 120, a memory 130, an I/O interface 150, a display 160 and a communication interface 170. The processor 120, the memory 130, the I/O interface 150, the display 160 and the communication interface 170 may be coupled to each other through a bus 110.

The memory 130 may stores instructions. The processor 120 may execute the instructions stored in the memory 130 to control the I/O interface 150, the display 160 and the communication interface 170 to perform specific operations.

The I/O interface 150 may receive the user input UIN and may provide the communication interface 170 with the user input UIN and the metadata MDT associated with the user input UIN.

The communication interface 170 may transmit the user input UIN and the metadata MDT to the streaming server 106, may receive the trained interactive frame prediction model IFPM and the encoded streaming data ESRDT from the streaming server 106, may store the trained interactive frame prediction model IFPM in the memory 130 and may provide the encoded streaming data ESRDT to a decoder 175 in the processor 120.

The processor 120 may apply the user input UIN, the metadata MDT and the encoded streaming data ESRDT to generate a predicted frame with respect to subject frame of the encoded streaming data ESRDT, and the decoder 175 in the processor 120 may decode the subject frame by referring to a higher-similarity frame selected from a previous frame of the encoded streaming data ESRDT and a predicted frame of the encoded streaming data ESRDT to recover the encoded streaming data ESRDT to generate a recovered streaming data RSDRT. The processor 120 may provide the recovered streaming data RSDRT to the user by displaying the recovered streaming data RSDRT in the display 160.

Referring to the recovered streaming data RSDRT displayed in the display 160, the user may play a game implemented by the recovered streaming data RSDRT by applying the user input UIN to the recovered streaming data RSDRT.

Figure 8A:
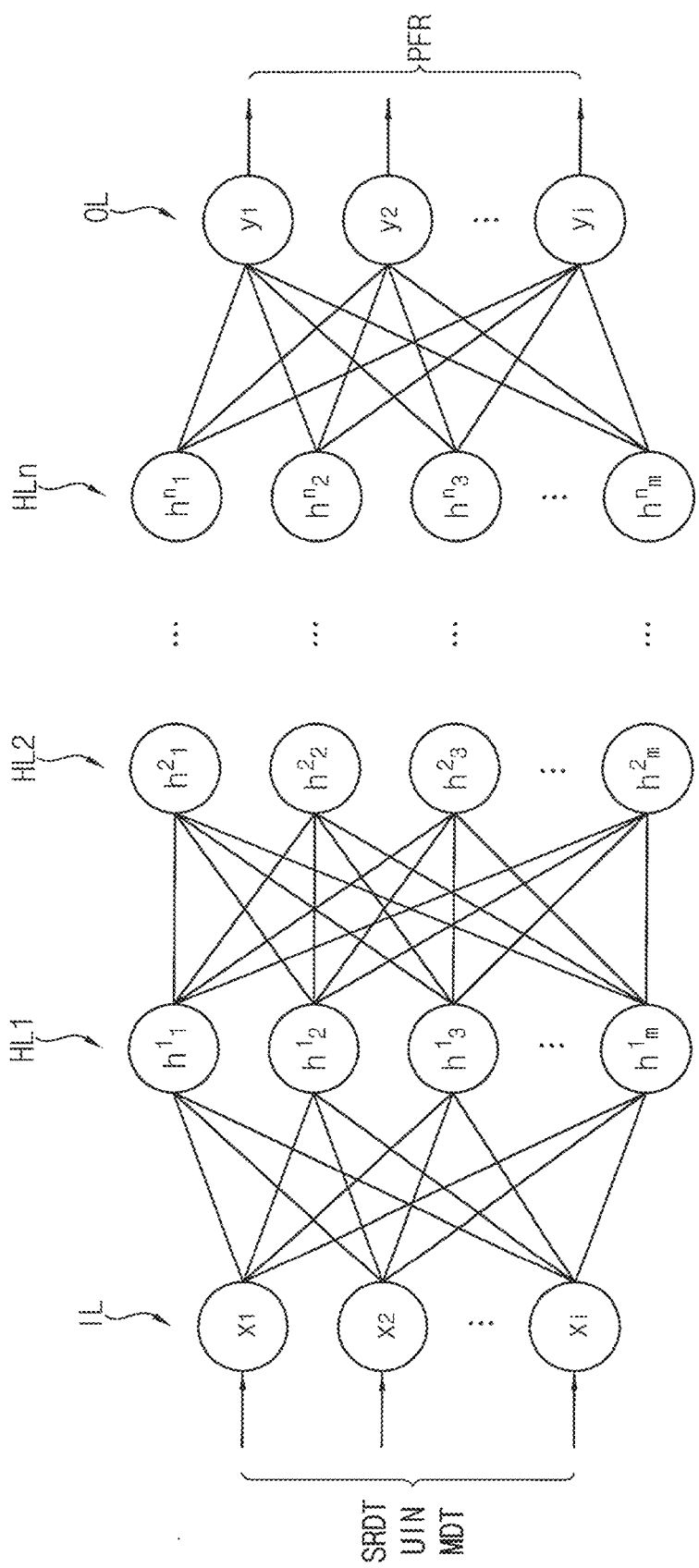
FIGS. 8A and 8B are diagrams for describing an example of a neural network in FIG. 6 according to example embodiments.
Figure 8B:
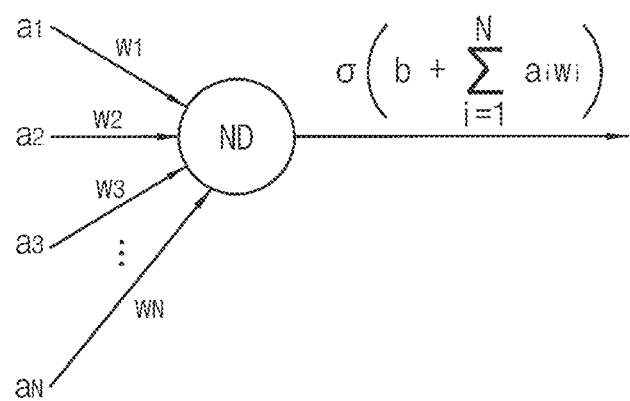

FIGS. 8A and 8B are diagrams for describing an example of a neural network in FIG. 6 according to example embodiments.

Referring to FIG. 8A, a general neural network may include an input layer IL, a plurality of hidden layers HL1, HL2, . . . , HLn and an output layer OL.

The input layer IL may include i input nodes $x_1, x_2, \ldots, x_i$, where i is a natural number. Input data (e.g., vector input data) IDAT whose length is i may be input to the input nodes $x_1, x_2, \ldots, x_i$ such that each element of the streaming data SRDT, the user input UIN and the metadata MDT is input to a respective one of the input nodes $x_1, x_2, \ldots, x_i$.

The plurality of hidden layers HL1, HL2, HLn may include n hidden layers, where n is a natural number, and may include a plurality of hidden nodes $h^1_1, h^1_2, h^1_3, \ldots, h^1_m, h^2_1, h^2_2, h^2_3, \ldots, h^2_m, h^n_1, h^n_2, h^n_3, \ldots, h^n_m$. For example, the hidden layer HL1 may include m hidden nodes $h^1_1, h^1_2, h^1_3, \ldots, h^1_m$, the hidden layer HL2 may include m hidden nodes $h^2_1, h^2_2, h^2_3, h^2_m$, and the hidden layer HLn may include m hidden nodes $h^n_1, h^n_2, h^n_3, \ldots, h^n_m$, where m is a natural number.

The output layer OL may include j output nodes $y_1, y_2, \ldots, y_j$, where j is a natural number. Each of the output nodes $y_1, y_2, \ldots, y_j$ may correspond to a respective one of classes to be categorized. The output layer OL may output output values (e.g., class scores or simply scores) or the predicted frame PFR associated with the input data for each of the classes. The output layer OL may be referred to as a fully-connected layer and may indicate, for example, a probability that the predicted frame PFR corresponds to an expected frame.

A structure of the neural network illustrated in FIG. 8A may be represented by information on branches (or connections) between nodes illustrated as lines, and a weighted value assigned to each branch, which is not illustrated. Nodes within one layer may not be connected to one another, but nodes of different layers may be fully or partially connected to one another.

Each node (e.g., the node $h^1_1$) may receive an output of a previous node (e.g., the node $x_1$), may perform a computing operation, computation or calculation on the received output, and may output a result of the computing operation, computation or calculation as an output to a next node (e.g., the node $h^2_1$). Each node may calculate a value to be output by applying the input to a specific function, e.g., a nonlinear function.

Generally, the structure of the neural network is set in advance, and the weighted values for the connections between the nodes are set appropriately using data having an already known answer of which class the data belongs to. The data with the already known answer is referred to as "training data," and a process of determining the weighted value is referred to as "training." The neural network "learns" during the training process. A group of an independently trainable structure and the weighted value is referred to as a "model," and a process of predicting, by the model with the determined weighted value, which class the input data belongs to, and then outputting the predicted value, is referred to as a "testing" process.

Referring to FIG. 8B, an example of an operation performed by one node ND included in the neural network of FIG. 8A is illustrated in detail.

When N inputs $a_1, a_2, a_3, \ldots, a_N$ are provided to the node ND, the node ND may multiply the N inputs $a_1, a_2, a_3, \ldots, a_N$ and corresponding N weights $w_1, w_2, w_3, \ldots, w_N$, respectively, may sums N values obtained by the multiplication, may add an offset "b" to a summed value, and may generate one output value (e.g., "z") by applying a value to which the offset "b" is added to a specific function "σ".

When one layer included in the neural network illustrated in FIG. 8A includes M nodes ND illustrated in FIG. 8B, output values of the one layer may be obtained by Equation 1.

$$W*A=Z \qquad [\text{Equation 1}]$$

In Equation 1, "W" represents weights for all connections included in the one layer, and may be implemented in an M*N matrix form. "A" represents the N inputs $a_1, a_2, a_3, \ldots, a_N$ received by the one layer, and may be implemented in an N*1 matrix form. "Z" represents M outputs $z_1, z_2, z_3, \ldots, z_M$ output from the one layer, and may be implemented in an M*1 matrix form.

Figure 9:
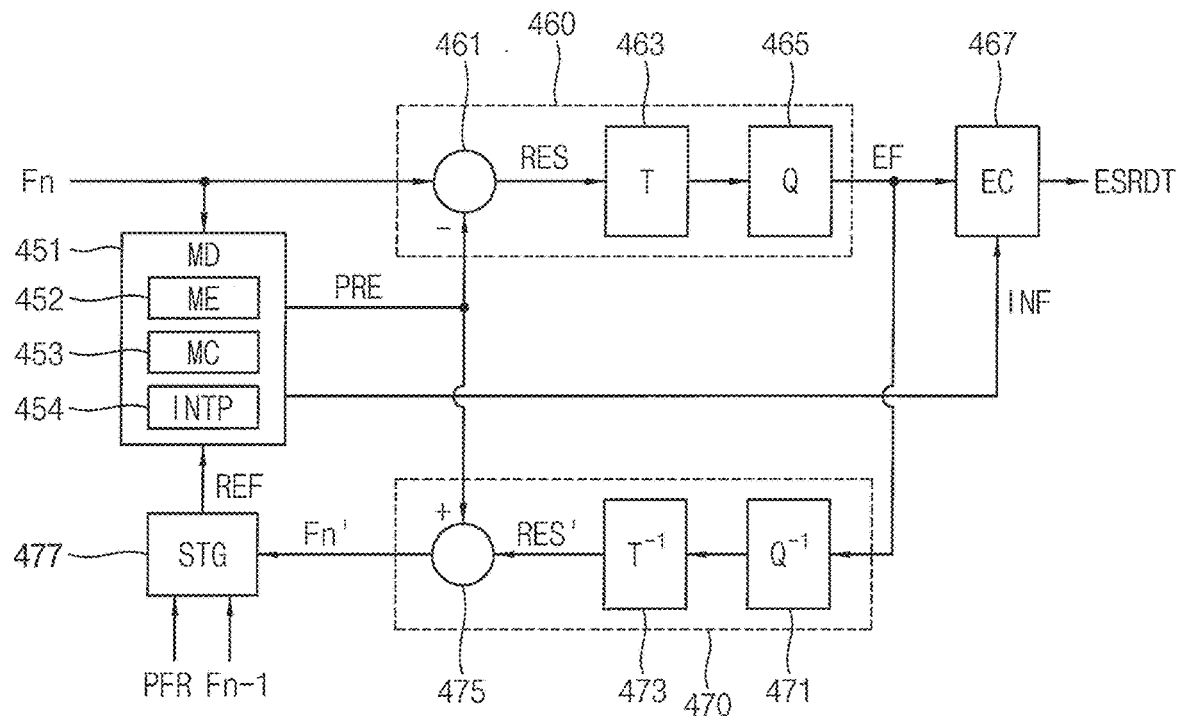
FIG. 9 is a block diagram illustrating an example of the encoder in the streaming server of FIG. 6 according to example embodiments.

FIG. 9 is a block diagram illustrating an example of the encoder in the streaming server of FIG. 6 according to example embodiments.

Referring to FIG. 9, the encoder 450 may include a mode decision block (MD) 451, a compression block 460, an entropy encoder (EC) 467, a reconstruction block 470 and a storage block (STG) 477.

The mode decision block 451 may generate a first predicted frame PRE based on a current picture Fn and a reference picture REF, and may generate coding information INF that includes a prediction mode depending on a prediction operation, a result of the prediction operation, syntax elements, context values, etc. The mode decision block 451 may include a motion estimation unit (ME) 452, a motion compensation unit (MC) 453 and an intra prediction unit (INTP) 454. The intra prediction unit 454 may perform an intra prediction. The motion estimation unit 452 and the motion compensation unit 453 may be referred to as an inter-prediction unit that performs an inter prediction.

The compression block 460 may encode the current frame Fn to generate an encoded frame EF. The compression block 460 may include a subtractor 461, a transform unit (T) 463 and a quantization unit (Q) 465. The subtractor 461 may subtract the first predicted frame PRE from the current frame Fn to generate a residual frame RES. The transform unit 463 and the quantization unit 465 may transform and quantize the residual frame RES to generate the encoded frame EF.

The reconstruction (recovery) block 470 may be used to generate a reconstructed frame Fn' by reversely decoding the encoded frame EF. The reconstruction block 470 may include an inverse quantization unit ($Q^{-1}$) 471, an inverse transform unit ($T^{-1}$) 473 and an adder 475.

The inverse quantization unit 471 and the inverse transform unit 473 may inverse-quantize and inverse-transform the encoded frame EF to generate a residual frame RES'. The adder 475 may add the residual frame RES' to the prediction picture PRE to generate the reconstructed frame Fn'.

The entropy encoder 467 may perform a lossless encoding with respect to the encoded frame EF and the coding information INF to generate the encoded streaming data ESRDT. The reconstructed picture Fn' may be stored into the storage 477, and may be used as another reference frame for encoding the other frames.

The storage 477 may store a previous frame Fn−1 and the predicted frame PRE output from the interactive frame prediction model IFPM and the motion estimation unit 452 may perform a motion estimation by referring to a higher-similarity frame selected from the previous frame Fn−1 and the predicted frame PFR, which has a higher similarity with the subject (present) frame Fn. That is, the encoder 450 may encode the subject frame Fn by using the higher-similarity frame selected from the previous frame Fn−1 and the predicted frame PFR to provide the encoded streaming data ESRDT to the client device 101.

Figure 10:
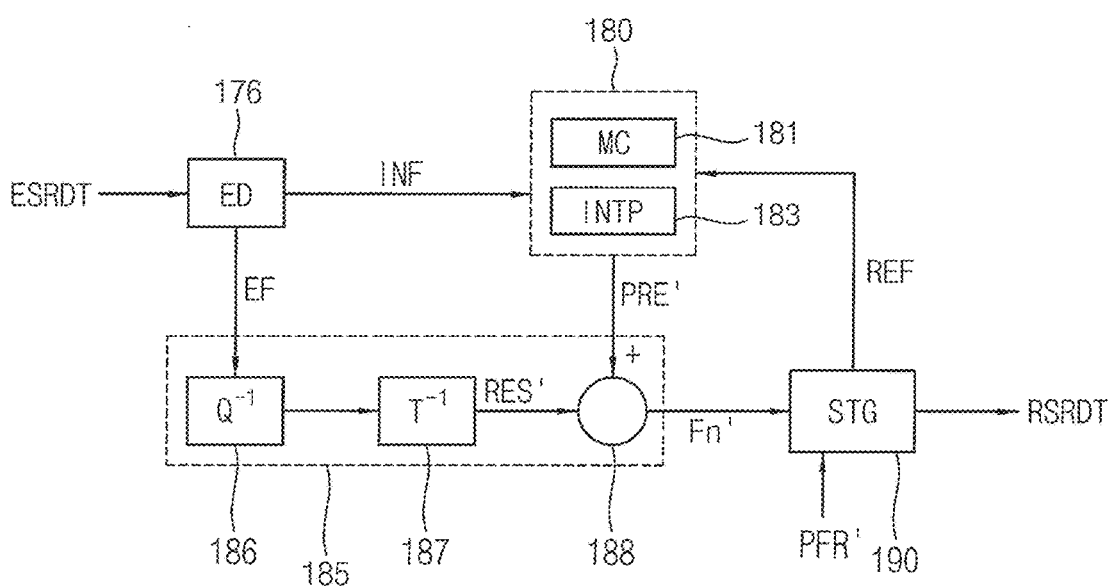
FIG. 10 is a block diagram illustrating an example of the decoder in the client device of FIG. 7 according to example embodiments.

FIG. 10 is a block diagram illustrating an example of the decoder in the client device of FIG. 7 according to example embodiments.

Referring to FIG. 10, the decoder 175 may include an entropy decoder (ED) 176, a prediction block 180, a reconstruction block 185 and a storage 190. The decoder 175 may generate a recovered streaming data by reversely decoding the encoded streaming data ESRDT that is encoded by the encoder 450.

The entropy decoder 176 may decode the encoded streaming data ESRDT to generate the encoded frame FM and the coding information INF.

The prediction block 180 may generate a second predicted frame PRE' based on the reference frame REF and the coding information INF. The prediction block 180 may include a motion compensation unit 181 and an intra prediction unit 183 that are substantially the same as the motion compensation unit 453 and an intra prediction unit 454 in FIG. 9, respectively.

The reconstruction block 185 may include an inverse quantization unit 186, an inverse transform unit 187 and an adder 188. The reconstruction block 185 and the storage 190 may be substantially the same as the reconstruction block 470 and the storage 477 in FIG. 9, respectively. The reconstructed frame Fn' may be stored in the storage 190 and may be used as another reference frame or may be provided to the display 160 as the encoded streaming data ESRDT.

The storage 190 may store the predicted frame PFR' provided from the interactive frame prediction model IFPM and the storage 190 may store a previous frame Fn−1 and the predicted frame PRE output from the interactive frame prediction model IFPM and the prediction block 180 may generate the second predicted frame PRE' by using a higher-similarity frame selected from a previous frame of the reconstructed frame Fn' and the predicted frame PFR', which has a higher similarity with the reconstructed frame Fn' as the reference frame REF.

Figure 11:
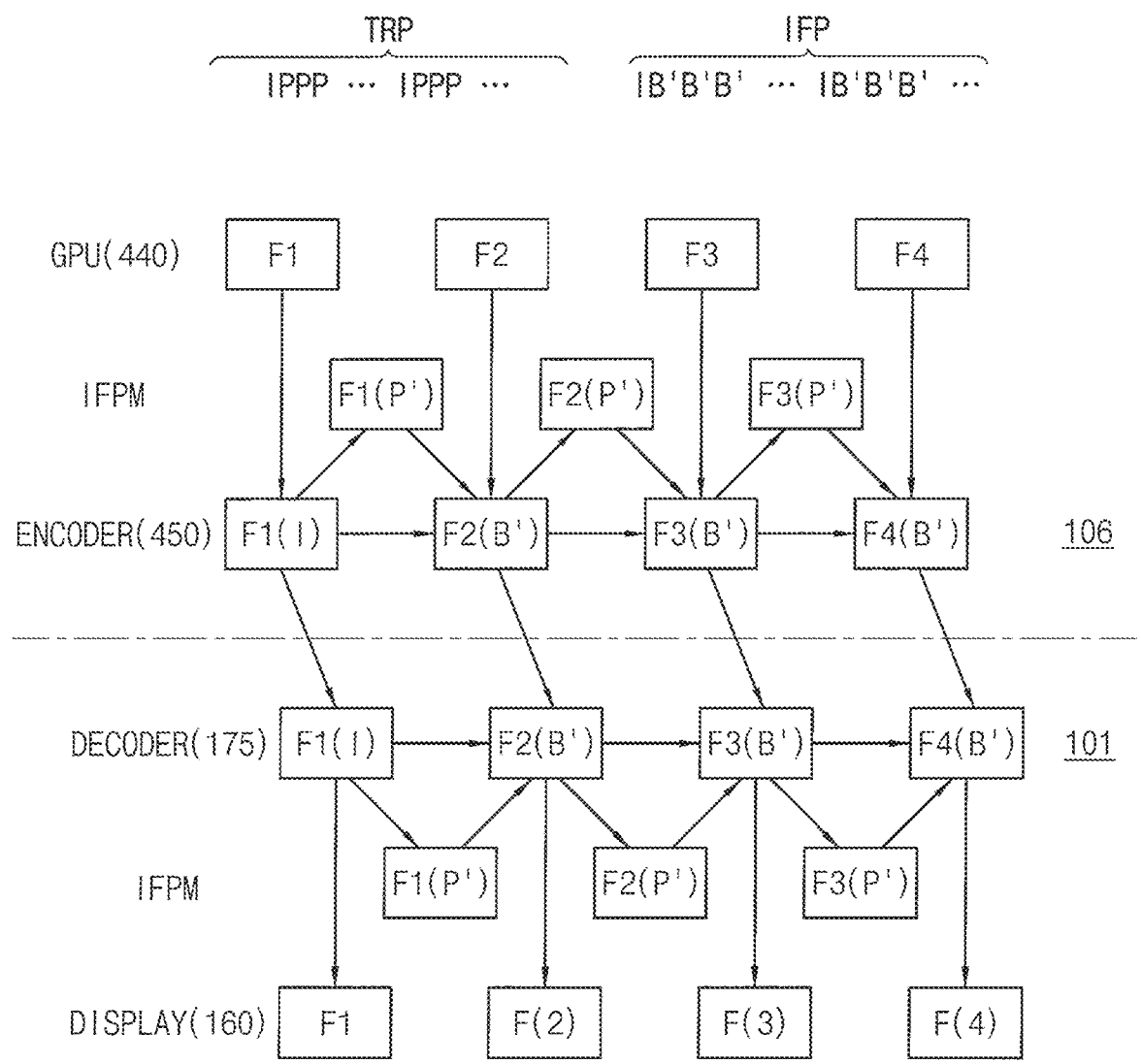
FIG. 11 illustrates operations of the encoder in FIG. 6 and the decoder in FIG. 7 according to example embodiments.

FIG. 11 illustrates operations of the encoder in FIG. 6 and the decoder in FIG. 7 according to example embodiments.

In example embodiments, the encoder 450 and the decoder 175 may respectively perform encoding and decoding with a group of picture (GOP) structure of a specific form. The GOP may conform to the standard defined by Moving Picture Expert Group (MPEG). According to the above standard, the GOP may have three kinds of frames. The GOP may have a combination of an I-frame, a P-frame, and/or a B-frame. For example, the GOP may have a repetition of "I B . . . BPB . . . B P". For another example, the GOP may have a repetition of "I P P . . . P". The three kinds of frames may be an Intra-coded frame (I-frame), a Predicted frame (P-frame), or a Bi-predictive frame (B-frame). The I-frame may be an independent frame. The P-frame may be a frame related to the I-frame or the P-frame. The B-frame may be a frame related to at least one of the I-frame and P-frame. For example, the B-frame may be generated based on a higher similarity frame selected from the I-frame and the P-frame. The B-frame may have a higher compression rate than the P-frame and the P-frame may have a higher compression rate than the I-frame.

During a training phase TRP, the GOP may have a repetition of "I P P P" and during an inference phase IFP, the GOP may have a repetition of "I B' B' B'". Here B' frame corresponds to a predicted frame provided by the trained interactive frame prediction model IFPM.

Referring to FIGS. 6, 7 and 11, the CPU 440 in the streaming server 106 sequentially generates frames F1, F2, F3 and F4. The interactive frame prediction model IFPM generates predicted frames F1(P'), F2(P') and F3(P') with respect to respective one of the frames F1, F2 and F3 based on the user input UIN and the metadata MDT and provides the predicted frames F1(P'), F2(P') and F3(P') to the encoder 450.

The encoder 450 encodes the frame F1 to generate an encoded frame F1(I), and encodes the subject frame F2 to generate the encoded frame F2(B') by referring to a higher-similarity frame selected from the previous frame F1(I) and the predicted frame F1(P'), which has a higher similarity with the subject frame F2. The encoders 450 encodes the subject frame F3 to generate the encoded frame F3(B') by referring to a higher-similarity frame selected from the previous frame F2(B') and the predicted frame F2(P'), which has a higher similarity with the subject frame F3, and encodes the subject frame F4 to generate the encoded frame F4(B') by referring to a higher-similarity frame selected from the previous frame F3(B') and the predicted frame F3(P'), which has a higher similarity with the subject frame F4.

The streaming server 106 provides the encoded frames F1(I), F2(B'), F3(B') and F4(B') to the client device 101. The trained interactive frame prediction model IFPM in the client device 101 generates predicted frames F1(P'), F2(P') and F3(P') with respect to respective one of the encoded frames F1(I), F2(B'), F3(B') based on the user input UIN and the metadata MDT and provides the predicted frames F1(P'), F2(P') and F3(P') to the decoder 175.

The decoder 175 decodes the encoded frames F1(I) to provide a recovered frame F1 to the display 160, and decodes the F2(B') by referring to a higher-similarity frame selected from the previous frame F1(I) and the predicted frame F1(P'), which has a higher similarity with the subject frame F2(B') to provide a recovered frame F2 to the display 160. The decoder 175 decodes the F3(B') by referring to a higher-similarity frame selected from the previous frame F2(B') and the predicted frame F2(P'), which has a higher similarity with the subject frame F3(B') to provide a recovered frame F3 to the display 160 and decodes the F4(B') by referring to a higher-similarity frame selected from the previous frame F3(B') and the predicted frame F3(P'), which has a higher similarity with the subject frame F4(B') to provide a recovered frame F4 to the display 160.

In FIG. 11, when it is assumed that a performance of the interactive frame prediction model IFPM is 100%, the streaming server 106 transmits the I-frame of each of the GOP to the client device 101 and the client device 101 generates the predicted frames by using the interactive frame prediction model IFPM to provide the recovered streaming data to the user.

Figure 12:
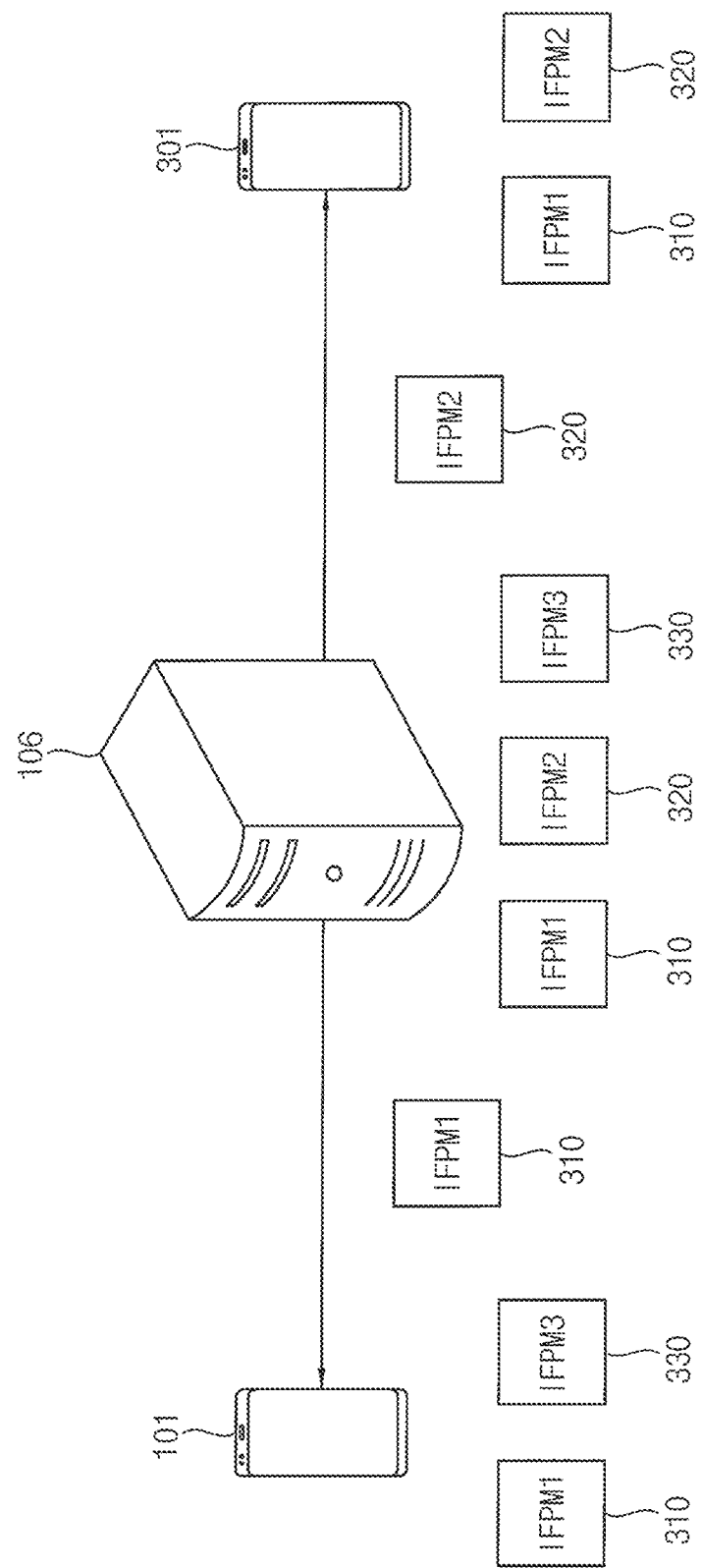
FIG. 12 is an example operation of the streaming server according to example embodiments.

FIG. 12 is an example operation of the streaming server according to example embodiments.

Referring to FIG. 12, the streaming server 106 may transmit a plurality of interactive frame prediction models IFPM1 (310), IFPM2 (320) and IFPM3 (330) to a plurality of client devices 101 and 301. The plurality of interactive frame prediction models 310, 320 and 330 are associated with a plurality of domains in the game implemented by the streaming data.

The streaming server 106 may train the plurality of interactive frame prediction models 310, 320 and 330 and may transmit the interactive frame prediction models 310, 320 and 330 to the client devices 101 and 301 after the training on the interactive frame prediction models 310, 320 and 330 is completed.

The interactive frame prediction model 310 may be associated with a first domain in the game implemented by the streaming data, the interactive frame prediction model 320 may be associated with a second domain in the game implemented by the streaming data and the interactive frame prediction model 30 may be associated with a third domain in the game implemented by the streaming data.

Each of the client device 101 and 301 may store the interactive frame prediction models 310, 320 and 330 in a memory therein, the client device 101 may select the interactive frame prediction model 310 among the interactive frame prediction models 310, 320 and 330 to use the selected interactive frame prediction model 310 for decoding and the client device 301 may select the interactive frame prediction model 320 among the interactive frame prediction models 310, 320 and 330 to use the selected interactive frame prediction model 320 for decoding.

Figure 13:
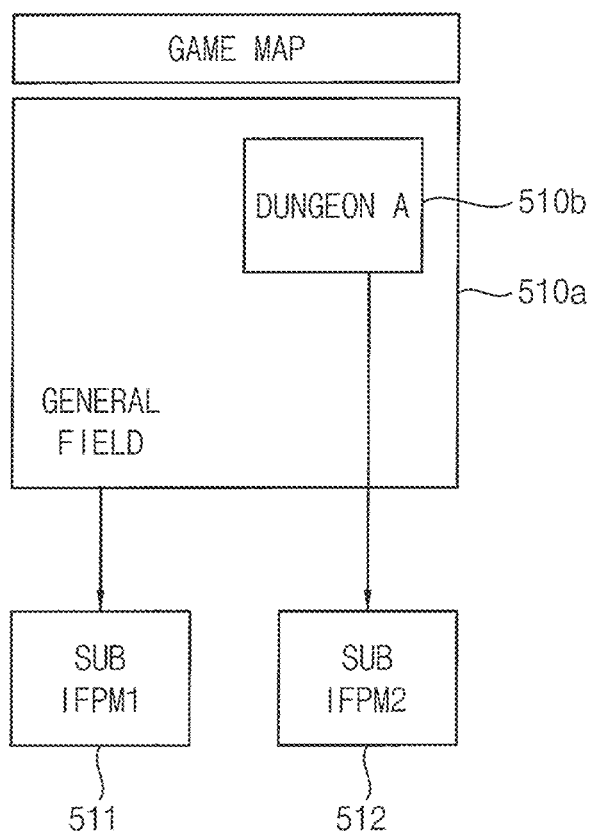
FIG. 13 is an example operation of the client device according to example embodiments.

FIG. 13 is an example operation of the client device according to example embodiments.

Referring to FIG. 13, the client device 101 may obtain a target streaming data corresponding to a target resolution of an original streaming data with respect to a target domain.

In some example embodiments, the target domain may include a plurality of sub domains corresponding to at least one of a plurality of designated regions. The target domain may include a first sub domain 510a corresponding to a first region (e.g., general field region) and a second sub domain 510b corresponding to a second region (e.g., dungeon A region).

The client device 101 may select target interactive frame prediction model corresponding to the target resolution of the original streaming data with respect to the target domain. The target interactive frame prediction model may include a plurality of sub interactive frame prediction models corresponding to the plurality of sub domains. For example, the target interactive frame prediction model may include a first sub interactive frame prediction model SUB_IFPM1 511 corresponding to the first sub domain 510a and a second sub interactive frame prediction model SUB_IFPM2 512 corresponding to the second sub domain 510b.

The client device 101 may select the first sub interactive frame prediction model 511 based on obtaining the target streaming data corresponding to the target resolution of the original streaming data with respect to the target domain.

Figure 14:
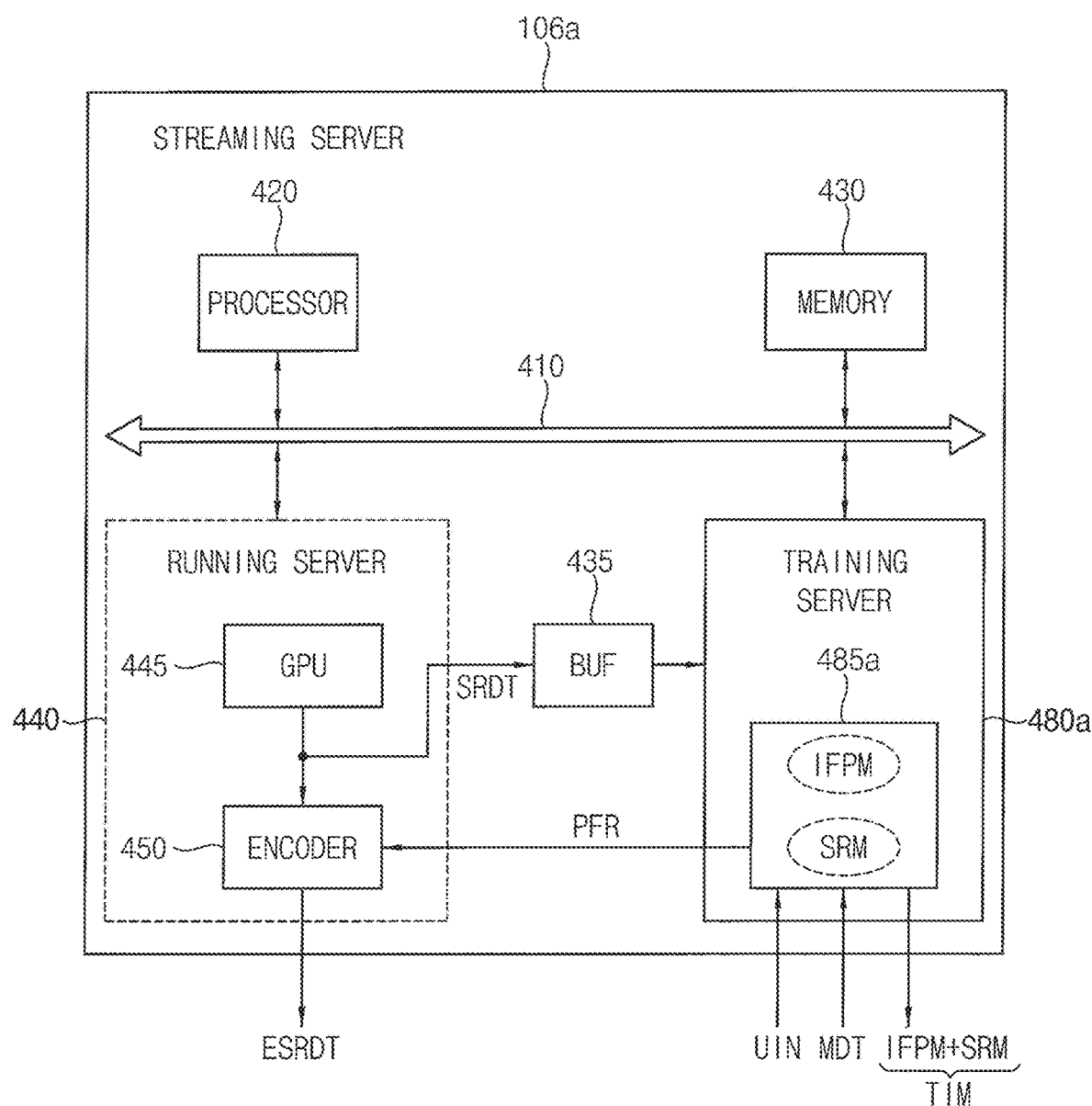
FIG. 14 is a block diagram illustrating an example of the streaming server in FIG. 1 according to example embodiments.

FIG. 14 is a block diagram illustrating an example of the streaming server in FIG. 1 according to example embodiments.

Referring to FIG. 14, a streaming server 106a may include the processor 420, the memory 430, the running server 440, the buffer 435 and a training server 480a. The streaming server 106a of FIG. 14 differs from the streaming server 106 in that the training server 480a stores a neural network 480a instead of the neural network 480.

The neural network 480a may estimate the streaming data SRDT and may adjust a resolution by using two inference models including the interactive frame prediction model IFPM and a super resolution model SRM. The processor 420 trains the interactive frame prediction model IFPM and a super resolution model SRM and may transmit the interactive frame prediction model IFPM and a super resolution model SRM to the client device 101 as a merged inference model TIM which is trained when the training on the interactive frame prediction model IFPM and a super resolution model SRM is completed.

The interactive frame prediction model IFPM performs frame prediction on the streaming data SRDT with a low resolution to provide the encoder 450 with a predicted frame PFR with a low resolution and the encoder 450 encode the streaming data SRDT having a low resolution by selectively referring to the predicted frame PFR with a low resolution, thereby increasing or improving a speed of encoding. The client device 101 receives the merged inference model TIM, and converts a recovered streaming data with a low resolution to a recovered streaming data with a high resolution by using the super resolution model SRM.

Figure 15:
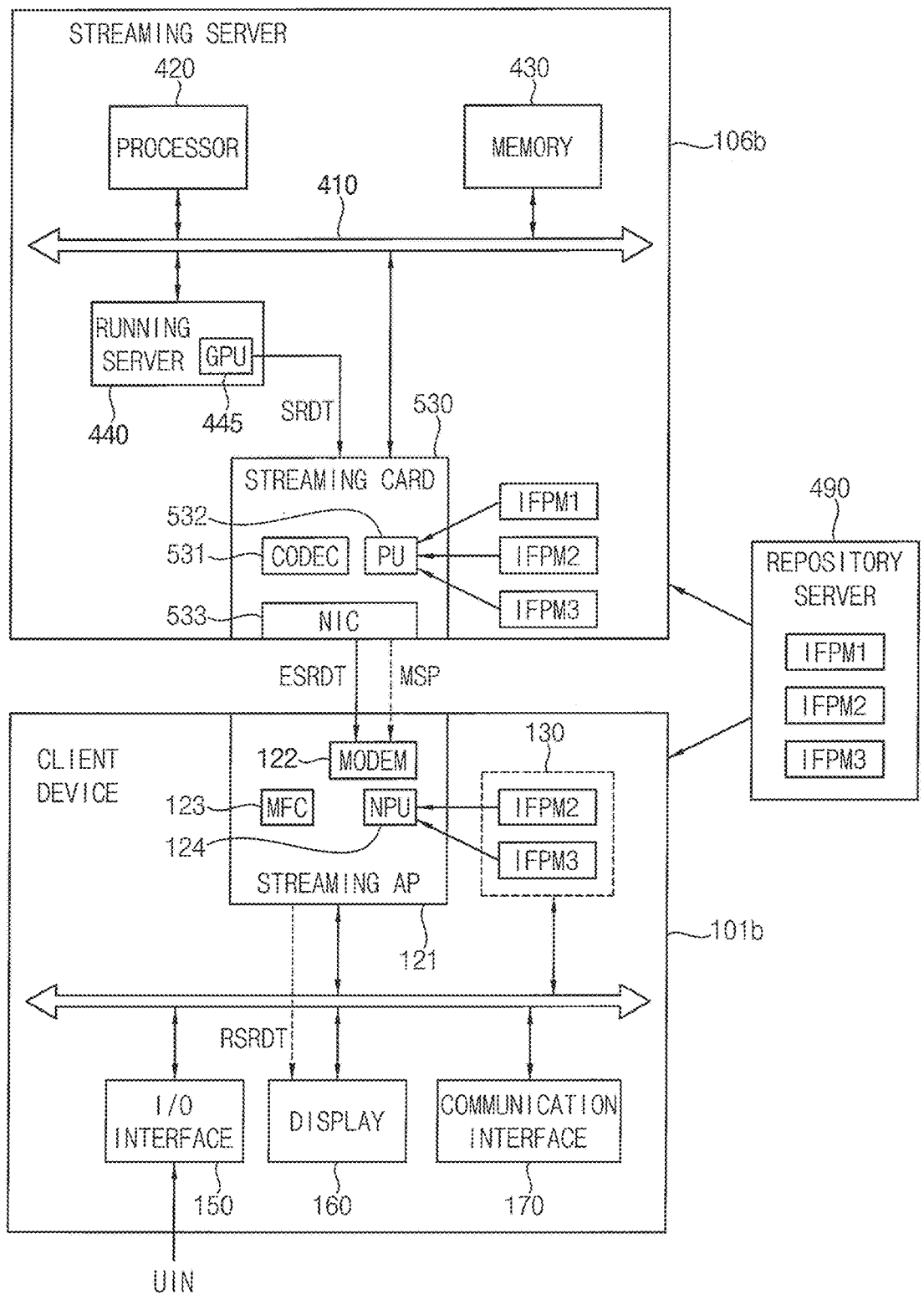
FIG. 15 illustrates a streaming system according to example embodiments.

FIG. 15 illustrates a streaming system according to example embodiments.

Referring to FIG. 15, a streaming system 100b may include a streaming server 106b and a client device 101b. In some example embodiments, the streaming system 100b may further include a repository server 490.

The streaming server 106b may include a processor 420, a memory 430, a running server 440 and a streaming card 530. The processor 420, the memory 430, the running server 440 and the streaming card 530 may be operatively coupled to each other through a bus 410.

The running server 4000 may include a GPU 445 and each operation of the processor 420, the memory 430 and the running server 440 may be substantially the same as the descriptions with reference to FIG. 6.

The streaming card 530 may include an encoder 531 such as CODEC, a processing unit (PU) 532 and a communication interface 533 such as a network interface card (NIC). The encoder 531 and the processing unit 532 may be manufactured into one chip. In some example embodiments, the NIC may include an Ethernet. In addition, the NIC may referred to as a local area network (LAN) and a device for connecting the streaming server 106b to a network.

The processing unit 532 may receive a plurality of interactive frame prediction models IFPM1, IFPM2 and IFPM3, may select one of the plurality of interactive frame prediction models IFPM1, IFPM2 and IFPM3 as a target interactive frame prediction model, may generate a predicted frame on a subject frame of the streaming data SRDT by applying the streaming data SRDT, the user input and the metadata to the target interactive frame prediction model and may provide the predicted frame to the encoder 531. The processing unit 532 may transmit information on the target interactive frame prediction model to the client device 101b as a model synchronization protocol MSP through the communication interface 533.

The encoder 531 may encode frames of the streaming data SRDT by selectively referring to the predicted frame to generate the encoded streaming data ESRDT and may transmit the encoded streaming data ESRDT to the client device 101b as a model synchronization protocol MSP through the communication interface 533.

The client device 101b may include a streaming application processor 121, a memory 130, an I/O interface 150, a display 160 and a communication interface 170. The streaming application processor 121, the memory 130, the I/O interface 150, the display 160 and the communication interface 170 may be coupled to each other through a bus 110. The streaming application processor 121 may be referred to as an application processor.

Each operation of the memory 130, the I/O interface 150 the display 160 may be substantially the same as the descriptions with reference to FIG. 7.

The streaming application processor 121 may include a modem 122, a decoder 123 such as a multi-function codec (MFC) and a neural processing unit (NPU) 124. The modem 122 may receive the encoded streaming data ESRDT and the model synchronization protocol MSP through the streaming server 106b.

The memory 130 may store the interactive frame prediction models IFPM2 and IFPM3 and may provide the interactive frame prediction models IFPM2 and IFPM3 to the NPU 124.

The NPU may select a target interactive frame prediction model among the interactive frame prediction models IFPM2 and IFPM3, which the streaming server 106b selects, based on the model synchronization protocol MSP, may obtain a predicted frame by applying the user input UIN, the metadata and frames of the encoded streaming data ESRDT to the target interactive frame prediction model, and may provide the predicted frame to the decoder 123.

The decoder 123 may decode the encoded streaming data ESRDT by selectively referring to the predicted frame to generate a recovered streaming data ESRDT and may provide the recovered streaming data ESRDT to the user through the display 160.

In FIG. 15, each of the streaming card 530 and the streaming application processor 121 may be implemented with hardware such as a logic circuit, processing circuitry, etc., the streaming card 530 may be installed the streaming server 101 and the streaming application processor 121 may be mounted on the client device 101b. In some example embodiments, when the streaming card 530 is installed in a personal computer, the personal computer may operate as the streaming server.

The repository server 490 may include the interactive frame prediction models IFPM1, IFPM2 and IFPM3, may train the interactive frame prediction models IFPM1, IFPM2 and IFPM3 and may transmit at least some of the interactive frame prediction models IFPM1, IFPM2 and IFPM3 to the training server 106b and the client device 101b when the training on the interactive frame prediction models IFPM1, IFPM2 and IFPM3 is completed.

Figure 16:
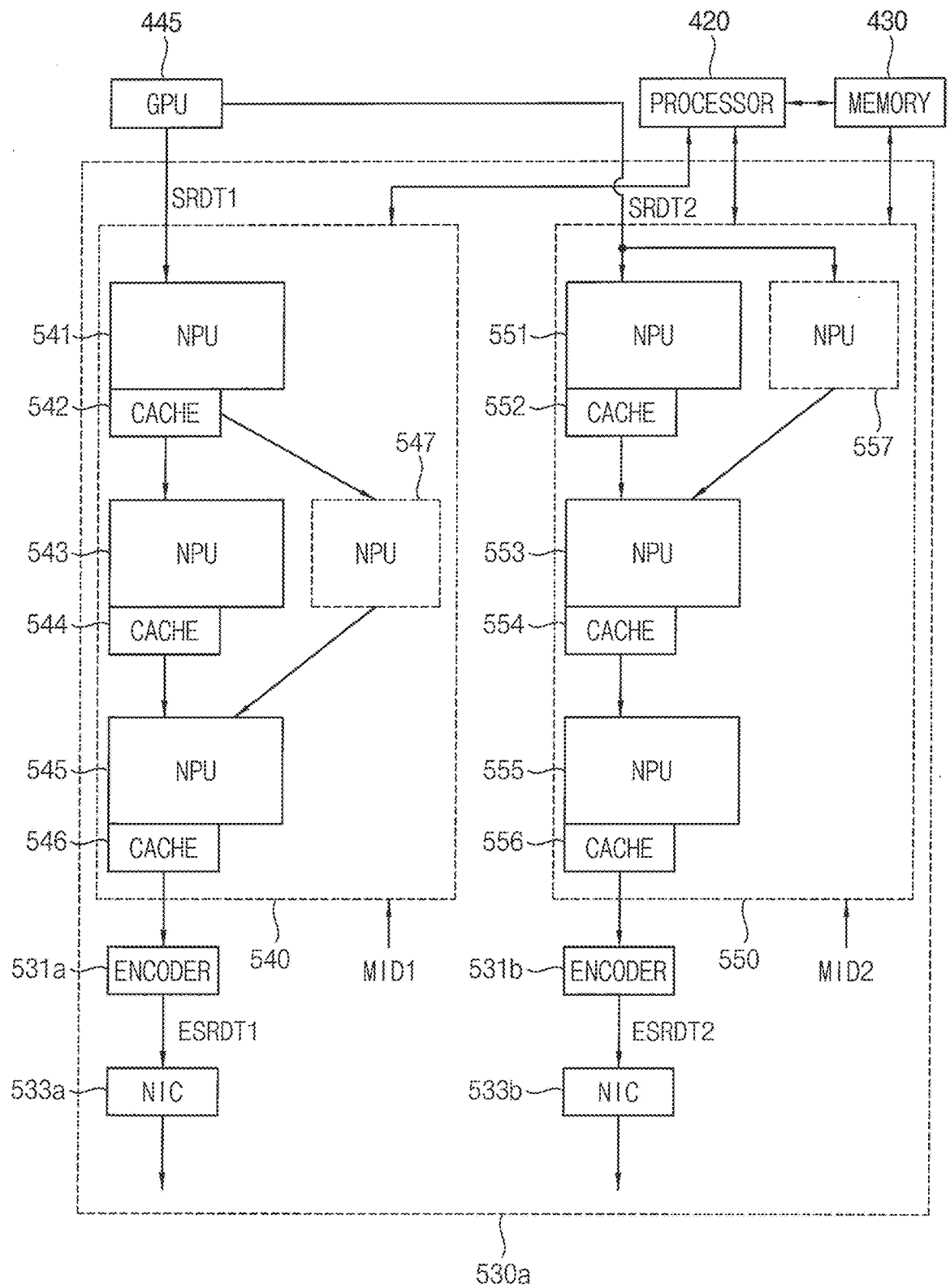
FIG. 16 is a block diagram illustrating an example of the streaming card in FIG. 15 according to example embodiments.

FIG. 16 is a block diagram illustrating an example of the streaming card in FIG. 15 according to example embodiments.

In FIG. 16, the GPU 445, the processor 420 and the memory 430 are also illustrated for convenience of explanation.

Referring to FIG. 16, a streaming card 530a may include a first processing cluster 540, a second processing cluster 550, a first encoder 531a, a second encoder 531b, a first communication interface 533a and a second communication interface 533b. Each of the first communication interface 533a and the second communication interface 533b may be implemented with an NIC.

The GPU 445 may generate a first streaming data SRDT1 associated with a first user and a second streaming data SRDT2 associated with a second user different from the first user, and may provide the first streaming data SRDT1 and the second streaming data SRDT2 to the first processing cluster 540 and the second processing cluster 550, respectively.

The first processing cluster 540 may generate a first predicted frame PFR1 by applying a first streaming data SRDT1 to a first interactive frame prediction model among a plurality of interactive frame prediction models and may provide the first predicted frame PFR1 to the first encoder 531a. The first processing cluster 540 may include a plurality of NPUs 541, 543 and 545 with a pipe-lined configuration, a plurality of caches 542, 544 and 546 respectively connected to the NPUs 541, 543 and 545 and a reserved NPU 547. The NPUs 541, 543 and 545 may implement different inference models using different neural networks, respectively. The reserved NPU 547 may employ a neural network model which will be used later. Each of the caches 542, 544 and 546 may store frequently-used data in respective one of the NPUs 541, 543 and 545 and may enhance performance.

The second processing cluster 550 may generate a second predicted frame PFR2 by applying a second streaming data SRDT2 to a second interactive frame prediction model among the plurality of interactive frame prediction models and may provide the second predicted frame PFR2 to the second encoder 531b. The second processing cluster 550 may include a plurality of NPUs 551, 553 and 555 with a pipe-lined configuration, a plurality of caches 552, 554 and 556 respectively connected to the NPUs 551, 553 and 555 and a reserved NPU 557. The NPUs 551, 553 and 555 may implement different inference models using different neural networks, respectively. The reserved NPU 557 may employ a neural network model which will be used later. Each of the caches 552, 554 and 556 may store frequently-used data in respective one of the NPUs 551, 553 and 555 and may enhance performance.

The first encoder 531a may encode the first streaming data SRDT1 by selectively referring to the first predicted frame PFR1 to generate a first encoded streaming data ESRDT1 and may transmit the first encoded streaming data ESRDT1 to a first client device that the first user uses through the first communication interface 533a.

The second encoder 531b may encode the second streaming data SRDT2 by selectively referring to the second predicted frame PFR2 to generate a second encoded streaming data ESRDT2 and may transmit the second encoded streaming data ESRDT2 to a second client device that the second user uses through the second communication interface 533b.

The first processing cluster 540 and the second processing cluster 550 may be incorporated into the processing unit 532 in FIG. 15, the first encoder 531a and the second encoder 531b may be incorporated into the encoder 531 in FIG. 15 and the first communication interface 533a and the second communication interface 533b may be incorporated into the communication interface 533 in FIG. 15.

The first processing cluster 540 may receive information MID1 on the first interactive frame prediction model from the repository server 490 in FIG. 15 and the second processing cluster 550 may receive information MID2 on the second interactive frame prediction model from the repository server 490 in FIG. 15.

Figure 17:
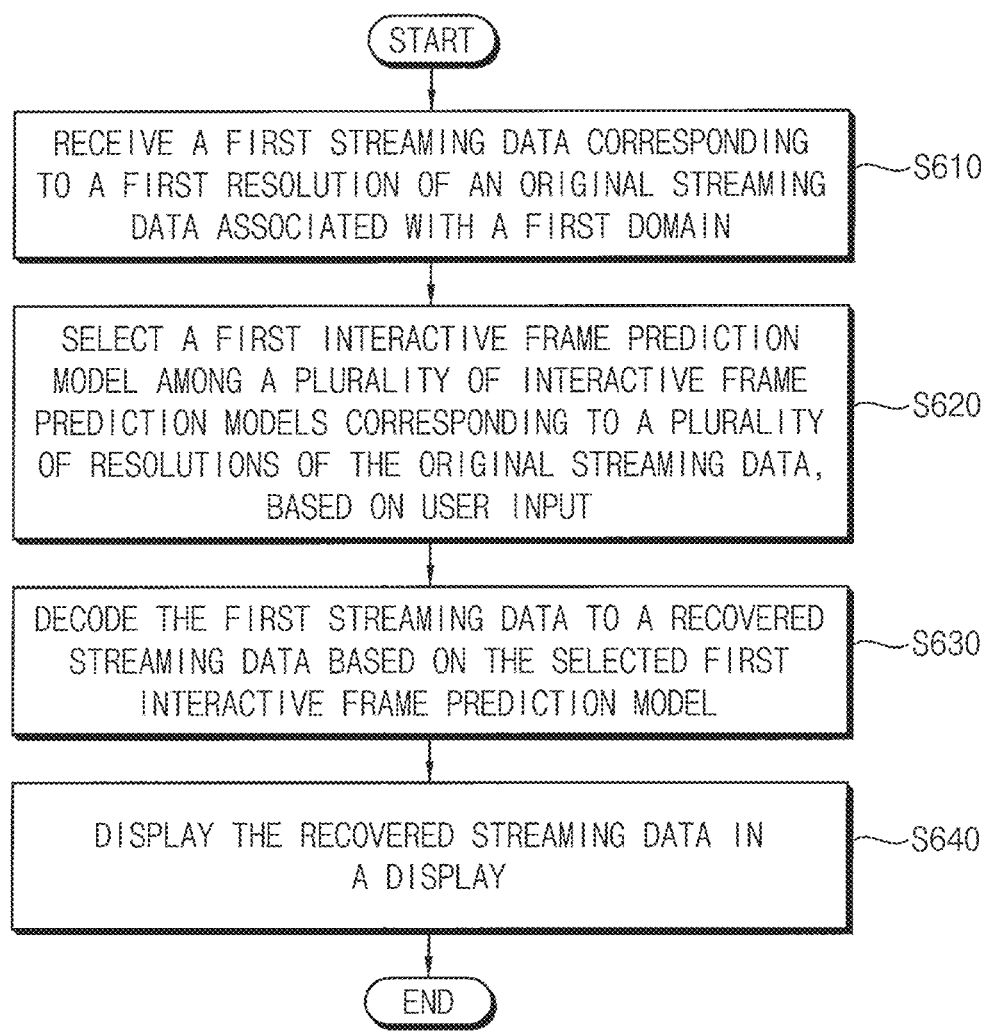
FIG. 17 is a flow chart illustrating an operation of the client device according to example embodiments.

FIG. 17 is a flow chart illustrating an operation of the client device according to example embodiments.

Figure 18B:
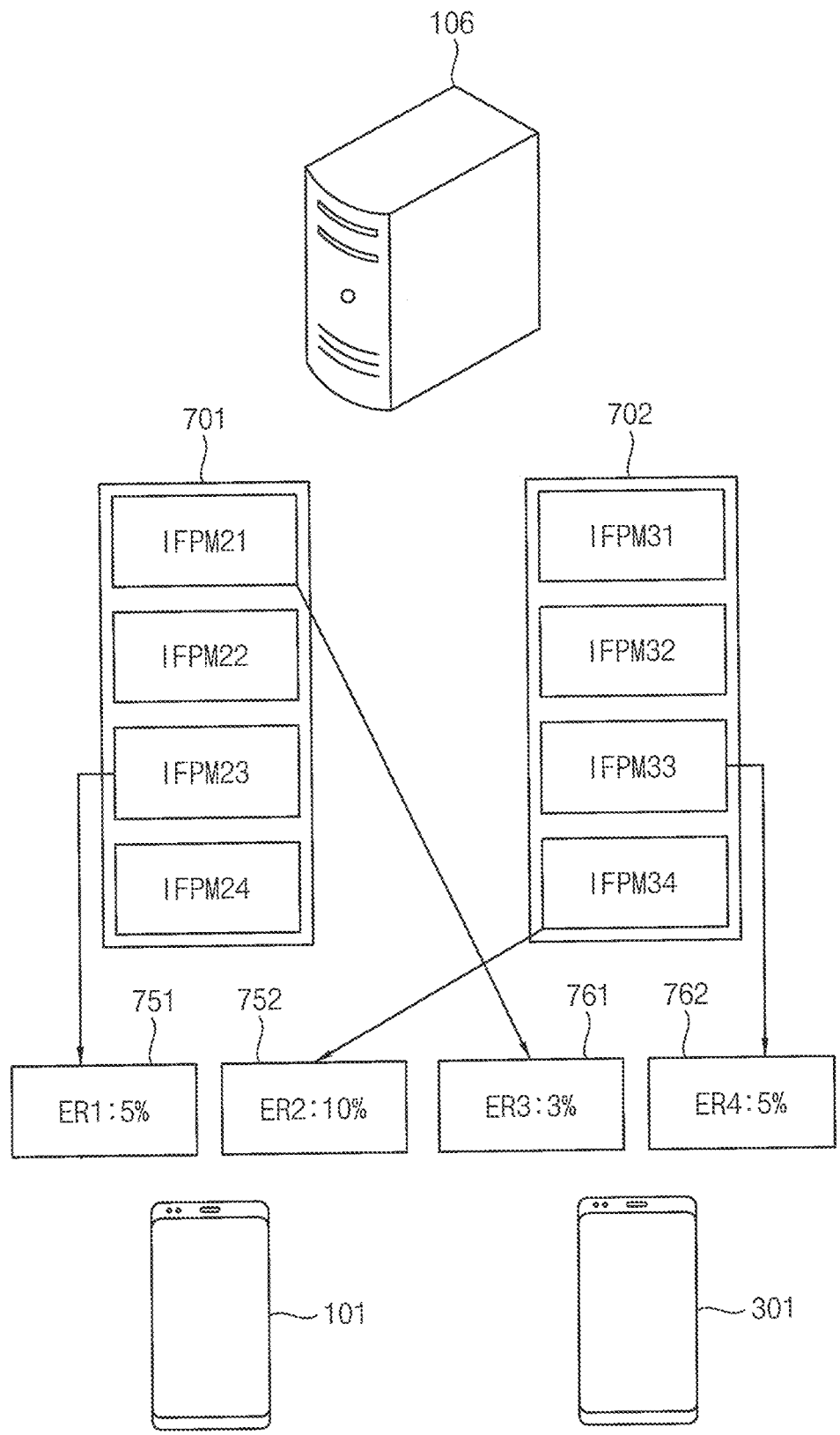

FIGS. 18A and 18B illustrate example operations of the client device, respectively.

In FIGS. 17 through 18B, it is assumed that an interactive frame prediction model is a model to which a resolution adjusting model such as the super resolution model SRM in FIG. 14 is further applied.

Referring to FIGS. 6, 7, 12 and 17 through 18B, the client device 101 may receive a first streaming data corresponding to a first resolution of an original streaming data associated with a first domain from the streaming server 106 through the communication interface 170 (operation S610). In some example embodiments, the user input may include a user input to select a network delay associated with the first domain, or a user input to select the first resolution of the original streaming data associated with the first domain. In some example embodiments, the client device 101 may receive a second streaming data corresponding to a second resolution from the streaming server 106 based on obtaining the user input during receiving the first streaming data corresponding to the first resolution from the streaming server 106.

The client device 101 may select a first interactive frame prediction model corresponding to the first resolution of the original streaming data among from a plurality of interactive frame prediction models corresponding to a plurality of resolutions of the original streaming data based on the user input (operation S620). In some example embodiments, the client device 101 may select at least one interactive frame prediction model SIFPM, conforming to image error rate (ER) (for example 3%) selected by the user, among from the plurality of interactive frame prediction models corresponding to the plurality of resolutions of the original streaming data. Referring to FIG. 18A, for example, the client device 101 may select at least one interactive frame prediction model, conforming to image error rate selected by the user at a first time point T1 or a second time point T2, among from a first interactive frame prediction model IFPM11 710 corresponding to a first resolution (for example 80% resolution with respect to an original resolution) of the original streaming data associated with a first domain 701, a second interactive frame prediction model IFPM12 720 corresponding to a second resolution (for example 60% resolution with respect to the original resolution) of the original streaming data associated with the first domain 701, a third interactive frame prediction model IFPM13 730 corresponding to a third resolution (for example 40% resolution with respect to the original resolution) of the original streaming data associated with the first domain 701 and a fourth interactive frame prediction model IFPM14 740 corresponding to a fourth resolution (for example 20% resolution with respect to the original resolution) of the original streaming data associated with the first domain 701.

The client device 101 may decode the first streaming data to a recovered first streaming data using the selected first interactive frame prediction model (operation S630). The client device 101 may display the recovered first streaming data in the display 160.

Referring to FIG. 18B, for example, there are four image error rates ER1 751, ER2 752, ER3 761 and ER4 762. The client device 101 may select at least one interactive frame prediction model associated with a specific domain, conforming to image error rate selected by the user, corresponding to a specific resolution. The client device 101 may select an interactive frame prediction model IFPM23, conforming to image error rate with 5% selected by the user and may select an interactive frame prediction model IFPM21 conforming to image error rate with 3%, among from interactive frame prediction models IFPM21, IFPM22, IFPM23 and IFPM24 associated with the first domain 701. A client device 301 may select an interactive frame prediction model IFPM33, conforming to image error rate with 5% selected by the user and may select an interactive frame prediction model IFPM34 conforming to image error rate with 10%, among from interactive frame prediction models IFPM31, IFPM32, IFPM33 and IFPM34 associated with a second domain 703. The selected interactive frame prediction mode may correspond to lowest resolution of the original streaming data.

Figure 19:
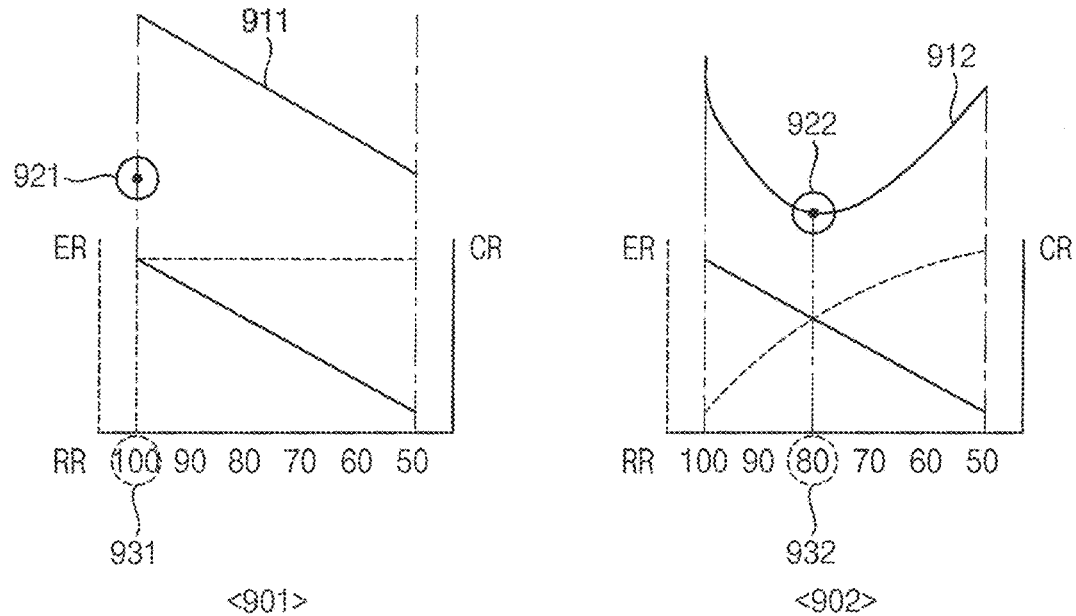
FIG. 19 illustrates an example operation of the client device according to example embodiments.

FIG. 19 illustrates an example operation of the client device according to example embodiments.

Referring to a reference numeral 901 in FIG. 19, a plurality of interactive frame prediction models with untrained state, corresponding to a plurality of resolutions of the original streaming data, are stored in the training server 106, and image error rate ER of each of the interactive frame prediction models may be '1'. The client device 101 may identify a resolution RR 931 associated with a predetermined, or, alternatively, desired, condition 921 (for example, original resolution 100%) from values 911 obtained by applying image error rates ER corresponding to a plurality of resolutions to compression rates CR corresponding to the plurality of resolutions. In a graph indicated by a reference numeral 901, since the resolution 931 corresponding to the original resolution with 100% has am image error rate ER with '0', the value associated with the predetermined, or, alternatively, desired, condition 921 may be obtained at the resolution 931.

Referring to a reference numeral 902 in FIG. 19, the plurality of interactive frame prediction models with trained state, corresponding to the plurality of resolutions of the original streaming data, are stored in the training server 106 after time elapses, and image error rate ER of each of the interactive frame prediction models may be different. The client device 101 may identify a resolution RR 932 associated with a predetermined, or, alternatively, desired, condition 922 (for example, original resolution 80%) from values 912 obtained by applying image error rates ER corresponding to a plurality of resolutions to compression rates CR corresponding to the plurality of resolutions, and may select an interactive frame prediction model corresponding to the resolution 932.

Figure 20:
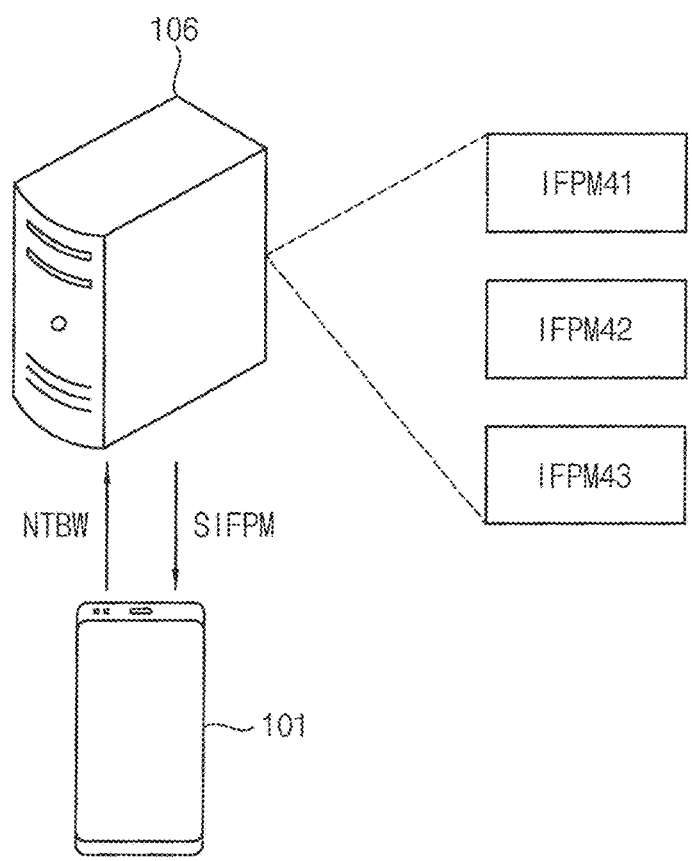
FIG. 20 illustrates an example operation of the client device according to example embodiments.

FIG. 20 illustrates an example operation of the client device according to example embodiments.

Referring to FIG. 20, the processor 120 in the client device 101 may identify a network bandwidth NTBW with respect to the client device 101 based on a predetermined, or, alternatively, desired, period, a request of a user and a request of the streaming server 106.

The client device 101 may transmit the identified network bandwidth NTBW to the streaming server 106.

The streaming server 106 may select an interactive frame prediction model corresponding to a selected resolution, among from a plurality of interactive frame prediction models IFPM41, IFPM42 and IFPM43 corresponding to a plurality of resolutions of an original streaming data based on compression rates corresponding to the plurality of resolutions of the original streaming data, image error rates corresponding to the plurality of resolutions and the network bandwidth NTBW of the client device 101. The streaming server 106 may transmit a selected interactive frame prediction model SIFPM corresponding to the identified resolution to the client device 101.

In FIGS. 19 and 20, it is assumed that an interactive frame prediction model is a model to which a resolution adjusting model such as the super resolution model SRM in FIG. 14 is further applied.

Figure 21:
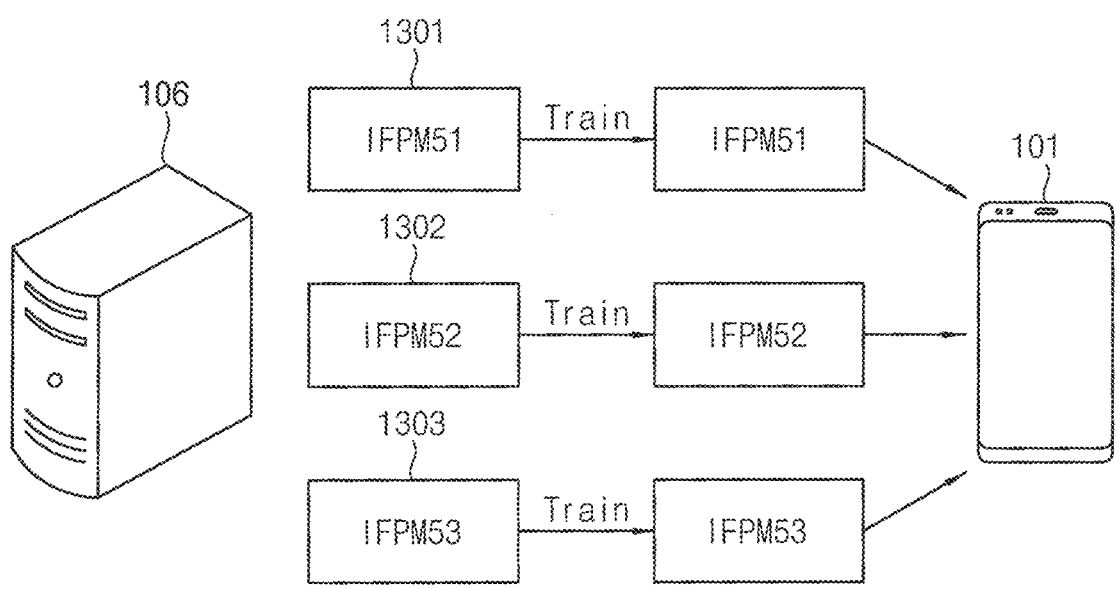
FIG. 21 illustrates a training operation of the streaming server according to example embodiments.

FIG. 21 illustrates a training operation of the streaming server according to example embodiments.

Referring to FIG. 21, the streaming server 106 may generate a plurality of streaming data corresponding to a plurality of resolutions of an original streaming data associated with a plurality of domains.

For example, the streaming server 106 may generate a plurality of streaming data corresponding to a plurality of resolutions of an original streaming data associated with a first domain 1301. The streaming server 106 may generate a plurality of streaming data corresponding to a plurality of resolutions of an original streaming data associated with a second domain 1302. The streaming server 106 may generate a plurality of streaming data corresponding to a plurality of resolutions of an original streaming data associated with a third domain 1303.

The streaming server 106 may train a plurality of interactive frame prediction models corresponding to a plurality of resolutions of an original streaming data by using an original streaming data associated with a specific domain and a plurality of streaming data corresponding to a plurality of resolutions of an original streaming data.

For example, the streaming server 106 may train a first interactive frame prediction model IFPM51 by providing a first streaming data corresponding to a first resolution associated with the first domain 1301 as a training data and an original streaming data corresponding to a first resolution associated with the first domain 1301 as an expected data to the first interactive frame prediction model IFPM51.

For example, the streaming server 106 may train a second interactive frame prediction model IFPM52 by providing a second streaming data corresponding to a second resolution associated with the second domain 1302 as a training data and an original streaming data corresponding to a second resolution associated with the second domain 1302 as an expected data to the second interactive frame prediction model IFPM52.

For example, the streaming server 106 may train a third interactive frame prediction model IFPM53 by providing a second streaming data corresponding to a third resolution associated with the third domain 1303 as a training data and an original streaming data corresponding to a third resolution associated with the third domain 1303 as an expected data to the third interactive frame prediction model IFPM53.

The streaming server 106 may provide the trained interactive frame prediction models IFPM51, IFPM52 and IFPM53 to the client device 101.

In FIG. 21, it is assumed that an interactive frame prediction model is a model to which a resolution adjusting model such as the super resolution model SRM in FIG. 14 is further applied.

Figure 22:
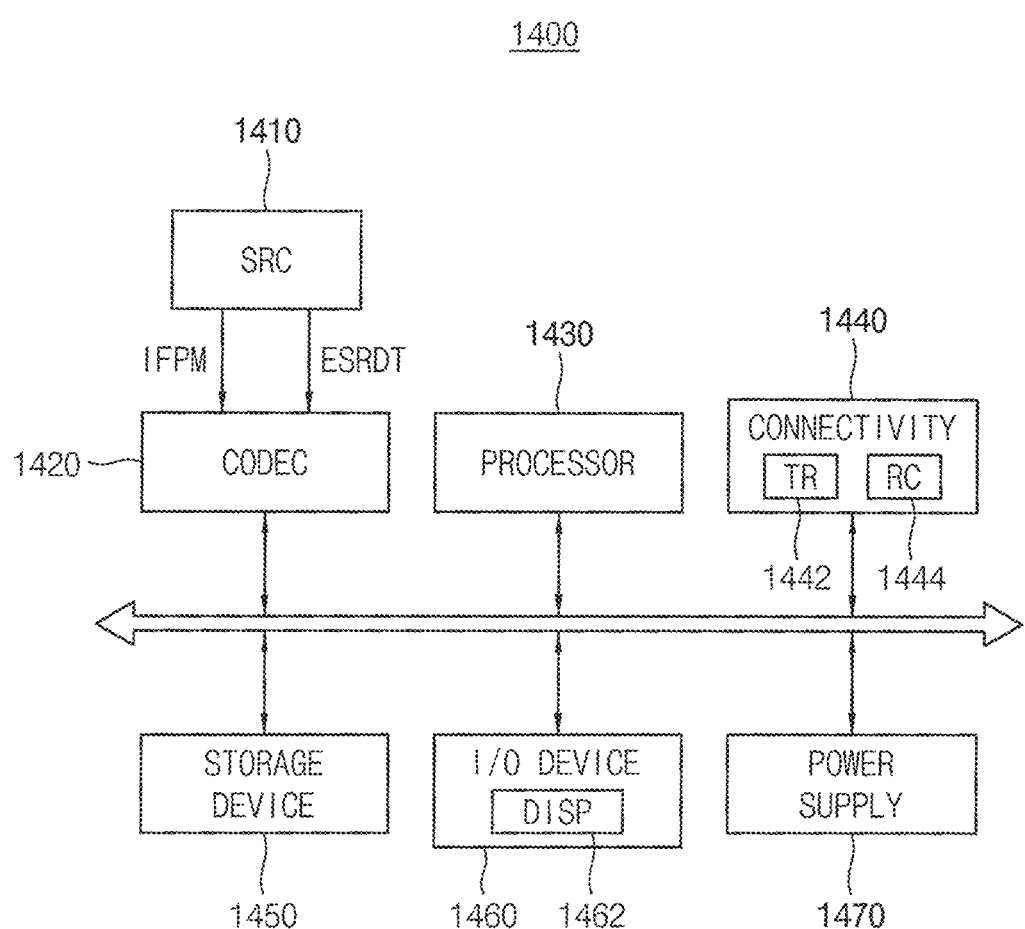
FIG. 22 is a block diagram illustrating an electronic system according to example embodiments.

FIG. 22 is a block diagram illustrating an electronic system according to example embodiments.

Referring to FIG. 22, an electronic system 1400 includes a video source 1410 and a video codec 1420. The electronic system 1400 may further include a processor 1430, a connectivity module 1440, a storage device 1450, an I/O device 1460 and a power supply 1470.

The video source 1410 provides an encoded streaming data ESRDT and interactive frame prediction model IFPM. For example, the video source 1410 may include a streaming server to provide streaming service. The video source 1410 may include an encoder according to example embodiments. The encoder may encode the streaming data by selectively referring to a predicted frame provided from the interactive frame prediction model IFPM to provide the encoded streaming data ESRDT.

The video codec 1420 may include a decoder according to example embodiments.

The processor 1430 may perform various computational functions such as particular calculations and tasks. The connectivity module 1040 may communicate with an external device and may include a transmitter 1442 and/or a receiver 1444. The storage device 1450 may operate as data storage for data processed by the electronic system 1400, or as a working memory.

The I/O device 1460 may include at least one input device such as a keypad, a button, a microphone, a touch screen, etc., and/or at least one output device such as a speaker, a display device 1062, etc. The power supply 1470 may provide power to the electronic system 1000.

Aspects of the present inventive concepts may be applied to various streaming servers that provide streaming services.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the inventive concepts. Accordingly, all such modifications are intended to be included within the scope of the inventive concepts as defined in the claims.

What is claimed is:

1. A streaming system comprising:
  a streaming server configured to
    train an interactive frame prediction model based on streaming data, a user input and metadata associated with the user input, the metadata includes information associated with the user input and the streaming data, including information of a map, or information of a weapon,
    encode the streaming data by selectively using a predicted frame generated based on the trained interactive frame prediction model, and
    transmit the trained interactive frame prediction model and the encoded streaming data; and
  a client device configured to
    receive the trained interactive frame prediction model and the encoded streaming data, and
    decode the encoded streaming data based on the trained interactive frame prediction model, a previous frame of the encoded streaming data, and the predicted frame to provide recovered streaming data to a user, the previous frame and the predicted frame are full frames.

2. The streaming system of claim 1, wherein the streaming server includes
  a processor;
  a memory, coupled to the processor, which stores instructions;
  a running server, coupled to the processor, which includes an encoder and a graphic processing unit (GPU) configured to generate the streaming data; and
  a training server, coupled to the processor, configured to store a neural network configured to implement the interactive frame prediction model.

3. The streaming system of claim 2, wherein the processor is configured to execute the instructions such that
  the GPU is configured to provide the streaming data to the training server; and
  the training server is configured to
    apply frames of the streaming data, the user input and the metadata to the interactive frame prediction model to train the interactive frame prediction model such that the interactive frame prediction model provides a predicted frame with respect to a subject frame of the streaming data,
    transmit the trained interactive frame prediction model to the client device when the training on the interactive frame prediction model is completed, and
    provide the predicted frame to the encoder.

4. The streaming system of claim 3, wherein the processor is configured to determine that the training on the interactive frame prediction model is completed in response to a difference between a compression rate of the predicted frame and a compression rate of an expected frame associated with the predicted frame being within a reference value.

5. The streaming system of claim 4, wherein the processor is configured to execute the instructions such that
the encoder is configured to
provide the encoded streaming data to the client device by encoding the subject frame by referring to a higher-similarity frame selected from a previous frame of the streaming data and the predicted frame, the higher-similarity frame having a higher similarity with the subject frame; and
perform a motion estimation by referring to the higher-similarity frame.

6. The streaming system of claim 2, wherein the training server is configured to adjust resolution of frames of the streaming data by further applying a super-resolution model to the frames of the streaming data.

7. The streaming system of claim 1, wherein the client device includes
a display;
a communication interface;
an input/output (I/O) interface configured to receive the user input;
a processor coupled to the display, the I/O interface and the communication interface; and
a memory, coupled to the processor, which stores instructions.

8. The streaming system of claim 7, wherein the processor is configured to execute the instructions such that
the I/O interface is configured to provide the streaming server with the user input and the metadata based on the user input through the communication interface; and
the communication interface is configured to receive the trained interactive frame prediction model to store the trained interactive frame prediction model in the memory, to generate a predicted frame by applying the encoded streaming data, the user input and the metadata to the trained interactive frame prediction model.

9. The streaming system of claim 8, wherein
the processor includes a decoder configured to decode the encoded streaming data to generate the recovered streaming data by selectively using the predicted frame; and
the processor is configured to execute the instructions to display the recovered streaming data in the display.

10. The streaming system of claim 7,
wherein the trained interactive frame prediction model corresponds to a model to which a resolution adjusting model is further applied, and
wherein the processor is configured to execute the instructions
to receive a first encoded streaming data corresponding to a first resolution of an original streaming data associated with a first domain through the communication interface;
to select a first trained interactive frame prediction model among a plurality of trained interactive frame prediction models corresponding to a plurality of resolutions of the original streaming data,
to decode the first streaming data to a first recovered streaming data based on the first trained interactive frame prediction model, and
to display the first recovered streaming data in the display.

11. The streaming system of claim 10, wherein the first domain includes a plurality of sub domains corresponding to a plurality of regions.

12. The streaming system of claim 10, wherein the processor is configured to select the first trained interactive frame prediction model corresponding to the first resolution based on the user input.

13. The streaming system of claim 1, wherein the client device supports a virtual reality.

14. A streaming system comprising:
a streaming server configured to
select a target interactive frame prediction model among a plurality of interactive frame prediction models,
train the target interactive frame prediction model based on streaming data, a user input and metadata associated with the user input and by using the target interactive frame prediction model,
generate a predicted frame by using the target interactive frame prediction model,
encode the streaming data by selectively using the predicted frame, and
transmit the encoded streaming data; and
a client device configured to
receive the plurality of interactive frame prediction models and the encoded streaming data,
select the target interactive frame prediction model among the plurality of interactive frame prediction models, and
decode the encoded streaming data based on the trained interactive frame prediction model to provide recovered streaming data to a user.

15. The streaming system of claim 14, wherein the streaming server includes:
a processor;
a memory, coupled to the processor, which stores instructions;
a running server, coupled to the processor, which includes an encoder and a graphic processing unit (GPU) configured to generate the streaming data; and
a streaming card, coupled to the processor, configured to generate the encoded streaming data by using the target interactive frame prediction model.

16. The streaming system of claim 15, wherein the streaming card includes
at least one processing unit configured to
select the target interactive frame prediction model among the plurality of interactive frame prediction models and
generate the prediction model by applying the streaming data, the user input and the metadata to the target interactive frame prediction model;
at least one encoder configured to generate the encoded streaming data by encoding a subject frame of the streaming data by referring to a higher-similarity frame selected from a previous frame of the streaming data and the predicted frame, the higher-similarity frame having a higher similarity with the subject frame; and
a communication interface configured to provide the encoded streaming data to the client device.

17. The streaming system of claim 16, wherein the at least one processing unit includes
a first processing cluster configured to generate a first predicted frame by applying a first streaming data associated with a first user to a first interactive frame prediction model among the plurality of interactive frame prediction models; and
a second processing cluster configured to generate a second predicted frame by applying a second streaming data associated with a second user different from the first user to a second interactive frame prediction model among the plurality of interactive frame prediction models, and wherein the first processing cluster and the second processing cluster support the plurality of interactive frame prediction models by pipeline scheme.

18. The streaming system of claim 14, wherein the client device includes:

a display;

a communication interface;

an input/output (I/O) interface configured to receive the user input;

an application processor coupled to the display, the I/O interface and the communication interface; and a memory, coupled to the application processor, which stores instructions, wherein the application processor is configured to execute the instructions to store the plurality of interactive frame prediction models received through the communication interface in the memory;

to apply the encoded streaming data, the user input and the metadata to the target interactive frame prediction model among the plurality of interactive frame prediction models to generate a predicted frame;

to decode the encoded streaming data based on the predicted frame to generate the recovered streaming data; and display the recovered streaming data in the display.

19. The streaming system of claim 14, further comprising:

a repository server configured to
store the plurality of interactive frame prediction models, configured to train the plurality of interactive frame prediction models and
provide the plurality of trained interactive frame prediction models to the streaming server and the client device.

20. A streaming server comprising:

a processor;

a memory, coupled to the processor, which stores instructions;

a running server, coupled to the processor, which includes an encoder and a graphic processing unit (GPU) configured to generate a streaming data; and a training server, coupled to the processor, configured to store a neural network configured to implement an interactive frame prediction model, wherein the processor is configured to execute the instructions such that the training server is configured to train the interactive frame prediction model based on the streaming data, a user input and metadata associated with the user input, the metadata includes information associated with the user input and the streaming data, including information of a map, or information of a weapon;

the encoder is configured to encode the streaming data by selectively using a predicted frame generated based on the trained interactive frame prediction model, the predicted frame being a full frame; and the training server is configured to transmit the trained interactive frame prediction model and the encoded streaming data to a client device.

* * * * *